US011539281B2

(12) United States Patent
Clymer et al.

(10) Patent No.: US 11,539,281 B2
(45) Date of Patent: Dec. 27, 2022

(54) MAGNETICALLY-COUPLED TORQUE-ASSIST APPARATUS

(71) Applicant: GREEN WAVE POWER SYSTEMS LLC, Haddam, CT (US)

(72) Inventors: Mark Lawrence Clymer, Moodus, CT (US); Brenda Lee McConnell, Moodus, CT (US)

(73) Assignee: GREEN WAVE POWER SYSTEMS LLC, Haddam, CT (US)

( * ) Notice: Subject to any disclaimer, the term of this patent is extended or adjusted under 35 U.S.C. 154(b) by 321 days.

(21) Appl. No.: 16/738,352

(22) Filed: Jan. 9, 2020

(65) Prior Publication Data

US 2020/0220446 A1 Jul. 9, 2020

Related U.S. Application Data

(60) Provisional application No. 62/872,030, filed on Jul. 9, 2019, provisional application No. 62/917,939, filed on Jan. 9, 2019.

(51) Int. Cl.
*H02K 5/02* (2006.01)
*H02K 49/10* (2006.01)
*F16F 6/00* (2006.01)

(52) U.S. Cl.
CPC ........... *H02K 49/108* (2013.01); *F16F 6/005* (2013.01)

(58) Field of Classification Search
CPC ...... H02K 49/106; H02K 49/108; H02K 5/02; H02K 2213/03
See application file for complete search history.

(56) References Cited

U.S. PATENT DOCUMENTS

| 4,795,929 A | 1/1989 | Elgass et al. |
| 4,843,268 A | 6/1989 | Hovorka |

(Continued)

FOREIGN PATENT DOCUMENTS

| CN | 101814871 A | 8/2010 |
| DE | 2423573 A1 | 11/1975 |

(Continued)

OTHER PUBLICATIONS

International Search Report for International Application No. PCT/US2021/040650 dated Oct. 25, 2021.

(Continued)

*Primary Examiner* — Dang D Le
(74) *Attorney, Agent, or Firm* — McCormick, Paulding & Huber PLLC

(57) ABSTRACT

A magnetically-coupled torque assist apparatus includes a movable (rotor) magnet configured to rotate about a rotor magnet axis extending through the rotor magnet, and a stationary (stator) magnet. The rotor magnet and the stator magnet have a gap therebetween. There is an equilibrium state position (ESP) of the rotor magnet where forces acting on the rotor magnet are balanced such that the rotor magnet is stationary about the rotor magnet axis. And when the rotor magnet is rotated from the equilibrium state position (ESP) to an elastically stressed state position (SSP), magnetic fields of the rotor magnet and the stator magnet generate a resultant magnetic force on the movable magnet that biases the movable magnet towards the equilibrium state position. In some embodiments, the stator and rotor magnets are configured to create a Halbach-effect magnetic field bloom, which contributes to the magnetic forces.

8 Claims, 25 Drawing Sheets

(56) References Cited

U.S. PATENT DOCUMENTS

| | | |
|---|---|---|
| 4,924,130 A | 5/1990 | Fratta |
| 4,944,270 A | 7/1990 | Matsushita et al. |
| 4,991,836 A | 2/1991 | Joffe |
| 5,896,961 A | 4/1999 | Aida et al. |
| 5,959,758 A | 9/1999 | Seo |
| 6,025,667 A | 2/2000 | Narita et al. |
| 6,107,793 A | 8/2000 | Yokotani et al. |
| 6,232,689 B1 | 5/2001 | Fujita et al. |
| 6,577,037 B2 | 6/2003 | Killen et al. |
| 6,682,430 B2 | 1/2004 | Killen |
| 6,703,829 B2 | 3/2004 | Tola |
| 6,707,446 B2 | 3/2004 | Nakamura et al. |
| 7,148,680 B2 | 12/2006 | Mizutani et al. |
| 7,250,702 B2 | 7/2007 | Abou Akar et al. |
| 7,453,177 B2 | 11/2008 | Highfill et al. |
| 7,994,674 B2 | 8/2011 | McClellan |
| 8,299,741 B2 | 10/2012 | Prasanna |
| 8,704,626 B2 | 4/2014 | Fullerton et al. |
| 9,062,654 B2 | 6/2015 | Yost |
| 9,331,534 B2 | 5/2016 | Yost |
| 9,960,647 B2 | 5/2018 | Vann |
| 10,110,109 B2 | 10/2018 | Farquharson |
| 10,125,814 B2 | 11/2018 | Walsh |
| 10,305,360 B2 | 5/2019 | Rustvoid et al. |
| 2002/0050902 A1 | 5/2002 | Asano et al. |
| 2003/0178103 A1 | 9/2003 | Harimoto et al. |
| 2004/0064153 A1 | 4/2004 | Creighton, IV et al. |
| 2004/0251757 A1 | 12/2004 | Porter, Sr. |
| 2009/0200883 A1 | 8/2009 | Halstead |
| 2011/0031837 A1 | 2/2011 | Kuritani et al. |
| 2011/0198958 A1 | 8/2011 | Kozeka |
| 2014/0213139 A1 | 7/2014 | Ferguson |
| 2015/0167639 A1 | 6/2015 | Choi et al. |
| 2015/0200582 A1* | 7/2015 | Headstrom ............ H02K 33/06 310/25 |
| 2018/0166949 A1 | 6/2018 | Hu et al. |
| 2018/0269767 A1 | 9/2018 | Diehl et al. |
| 2020/0386289 A1* | 12/2020 | Clymer ................ H02K 49/108 |

FOREIGN PATENT DOCUMENTS

| | | |
|---|---|---|
| DE | 39 31 611 A1 | 3/1990 |
| EP | 1139354 A2 | 10/2001 |
| EP | 1 670 126 A1 | 6/2006 |
| JP | 2010316502 A | 9/2010 |
| JP | 2016220505 B2 | 12/2016 |
| KR | 10-2004-0096994 A | 11/2004 |
| KR | 20190141306 A | 12/2019 |
| WO | 2011057423 A1 | 5/2011 |
| WO | 2018/106935 A2 | 6/2018 |

OTHER PUBLICATIONS

Written Opinion for International Application No. PCT/US2021/040650 dated Oct. 25, 2021.
International Search Report for International Application No. PCT/IB2020/052039 dated Jun. 22, 2020.
Written Opinion for International Application No. PCT/IB2020/052039 dated Jun. 22, 2020.
International Search Report for International Application No. PCT/US2020/012880 dated May 8, 2020.
Written Opinion for International Application No. PCT/US2020/012880 dated May 8, 2020.
Extended European Search Report for corresponding EP Application No. 20738431.4 dated Jul. 26, 2022.

* cited by examiner

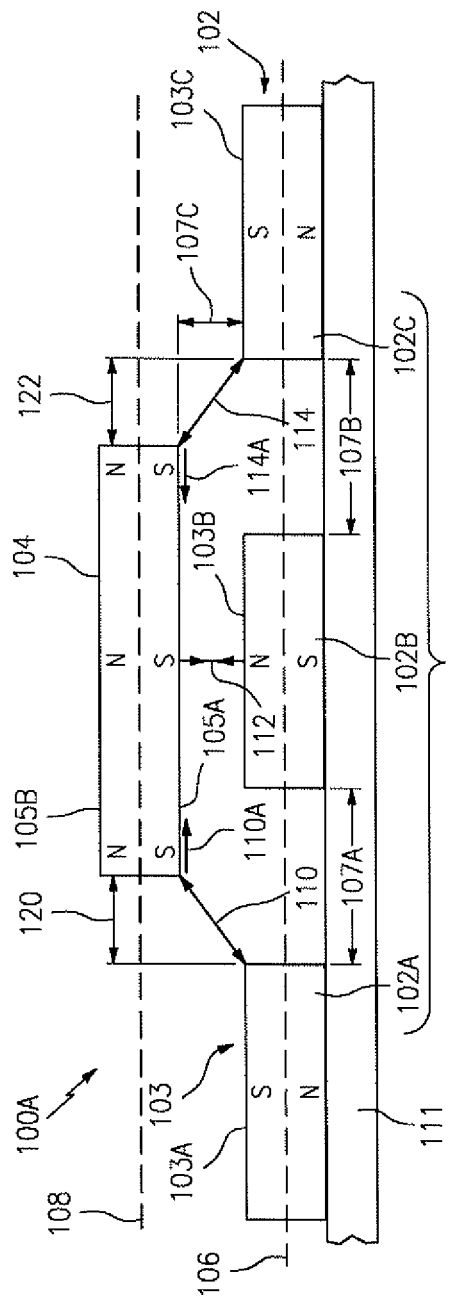
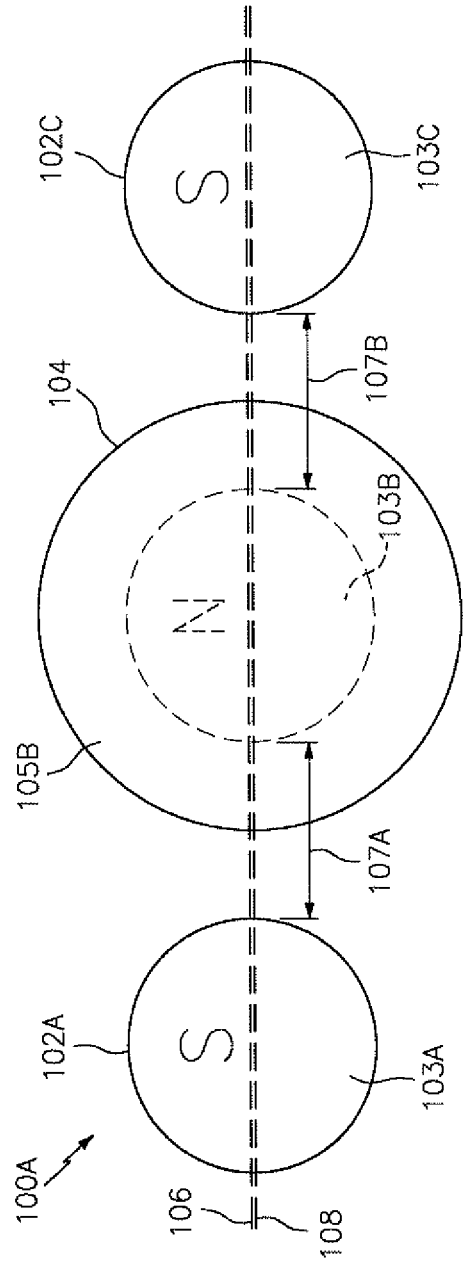

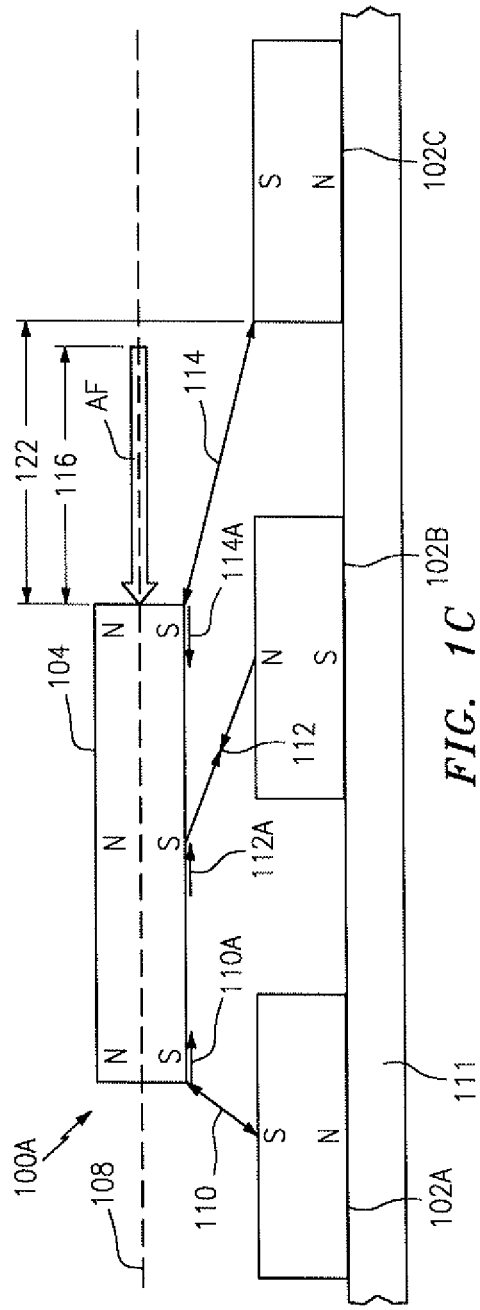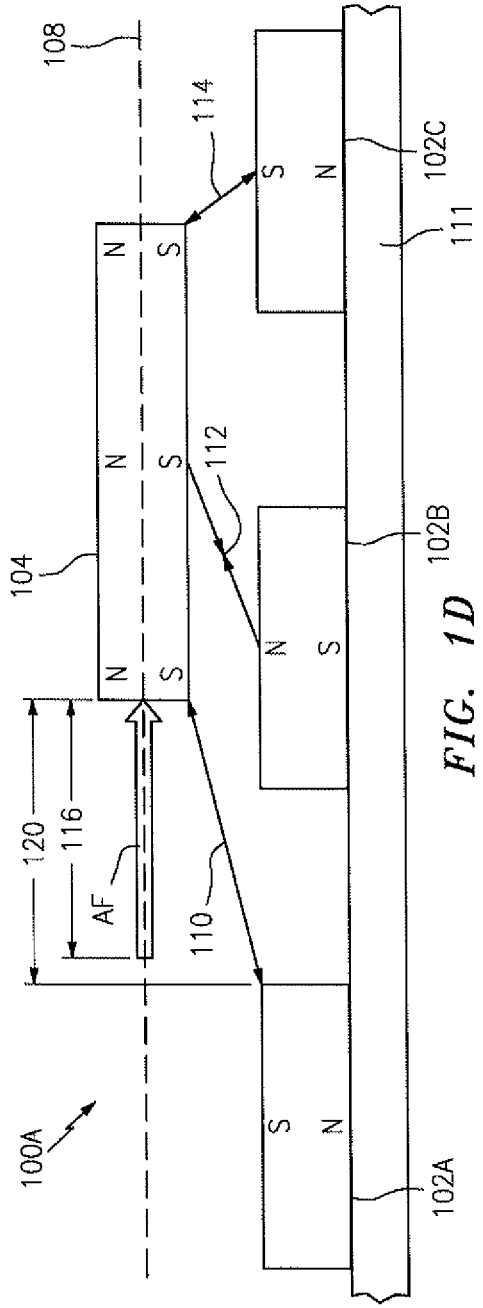

MAGNETICALLY-COUPLED TORQUE-ASSIST APPARATUS

CROSS-REFERENCE TO RELATED APPLICATIONS

This application claims the benefit of U.S. Provisional Patent Application No. 62/872,030 filed on Jul. 9, 2019, and claims the benefit of U.S. Provisional Patent Application No. 62/917,939 filed on Jan. 9, 2019, each of which is hereby incorporated by reference in its entirety, to the fullest extent permitted under applicable law.

BACKGROUND

Conventional mechanical springs or coils are known for converting mechanical kinetic energy (e.g., force-in) applied to the spring, into elastic potential energy stored in the spring, and then, when the input force is removed, converting (or releasing) the stored potential energy back into mechanical kinetic energy (e.g., distance or motion or force-out). Springs also may provide predictable and repeatable force-in/distance-out characteristics (e.g., linear regions of operation) which allows them to be used in systems/applications that require such performance. Various types and configurations of springs include compression springs, extensions springs, torsion (or rotational) springs and the like. Springs are typically made of steel or metal alloys or non-metallic materials such as plastic. The material and type of spring is based on the type of application, as is known. Conventional springs are used in many different applications and systems, e.g., clocks/watches, doors/hinges/latches, shock-absorbers/suspensions, and many other applications/devices.

However, conventional springs present several problems. In particular, conventional springs are vulnerable to wear and/or structural fatigue or failure during use (including breakage), which may require repair or replacement in the application or system in which the spring is utilized. Springs may also become stretched beyond their design limits (e.g., over deflection due to excessive weight load or input force), which may cause permanent structural deformation or damage to the spring.

It is also known to use a magnetic-based coupling on a rotating shaft between an input (or applied) rotational force and a rotational load, to improve efficiency and/or to reduce maintenance costs. However, such devices can be expensive and complex to manufacture.

Accordingly, it would be desirable to design a device that overcomes the above problems and shortcomings while retaining the benefits.

BRIEF DESCRIPTION OF THE DRAWINGS

FIG. 1A is a side view of a magnetically-coupled device in accordance with embodiments of the present disclosure.

FIG. 1B is a top view of the magnetically-coupled device of FIG. 1A in accordance with embodiments of the present disclosure.

FIG. 1C is a side view of the magnetically-coupled device of FIG. 1A in operation in accordance with embodiments of the present disclosure.

FIG. 1D is a side view of the magnetically-coupled device of FIG. 1A in operation in accordance with embodiments of the present disclosure.

DETAILED DESCRIPTION

Figure 1E:
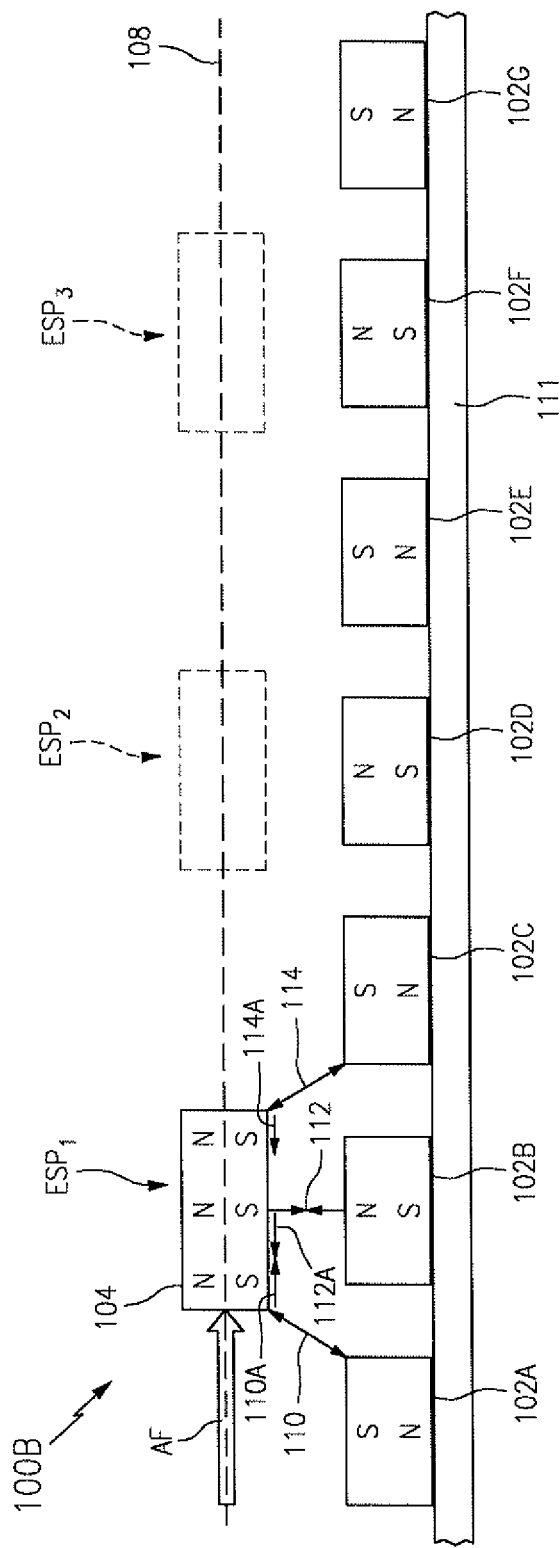
FIG. 1E is a side view of a magnetically-coupled device in accordance with embodiments of the present disclosure.

As discussed in more detail below, in some embodiments, the present disclosure is directed to systems and methods for a magnetically-coupled spring, a magnetic spring, a magnetically-coupled device (magnetic coupling), or a magnetically-coupled torque-assist device or module or apparatus, which uses high-energy permanent magnets arranged to form one or more movable magnets (or "rotor"), and a stationary set of magnets (or "stator"), and configured to use elastic properties of magnetic fields to provide a spring-like mechanical and energy storage properties. The rotor and stator magnets may be contained within or disposed on a variety of housings, platforms and structures. The stator may be attached to a stationary structure or a moving or rotating structure, such as a rotating shaft or moving platform or vehicle. In some embodiments, input angular force or torque is applied to an input shaft which is mechanically connected to the movable magnet or rotor, and the stator is mechanically connected to an output shaft. The magnetically-coupled device of the present disclosure may use permanent magnets of any shape and size, based on the desired design parameters. In some embodiments, the rotor and stator, when both are attached to rotating shafts, may be referred to respectively herein as a drive rotor (connected to an input applied force) and a load rotor (connected to a load), or vice versa.

In some embodiments, the magnetically-coupled device of the present disclosure utilizes the elastic effect of attractive and repulsive magnetic fields to operate by simultaneously applying tension to (or stretching or pulling on) attractive elastic magnetic field forces (created by opposite-polarity attraction, e.g., N-S or S-N) and applying compression to (or pushing on) elastic repulsive magnetic field forces (created by same-polarity repulsion, e.g., N-N or S-S) between the rotor and the stator, which may also be referred to herein collectively as a magnetic "dual-forces" or "tension-compression" or "attraction-repulsion" or "push-pull" arrangement.

As a result, in some embodiments, the rotor-stator combination may have various states or positions of operation, such as: (i) an equilibrium state position (ESP), where there is no external input force and the aggregate magnetic forces (attraction and repulsion) between the rotor and the stator magnets in the direction of rotor magnet movement or rotation sum to zero (or are balanced) and, thus, the rotor is stationary relative to the stator; (ii) an elastically stressed (or elastically altered or elastically deformed) state position (SSP), where an input force causes the rotor to move away from the ESP in the direction of rotor magnet movement (or rotation), and at least a portion of the attractive elastic magnetic field forces (or lines) are stretched (or pulled or placed under tension) and at least a portion of the repulsive elastic magnetic field forces (on at least one side of the rotor magnet) are compressed (or pushed or placed under compression), which elastic forces collectively resist the movement of the rotor in such rotor magnet movement (or rotation) direction; and (iii) a decoupled state position (DSP), where the input force exceeds the aggregate (or total or resultant or net) attractive and repulsive elastic magnetic field forces resisting the rotor movement (or rotation), and the rotor becomes magnetically "decoupled" from the stator in the direction of rotor magnet motion (or rotation), and magnetically breaks-free (or releases or decouples) from the stator allowing the rotor to move (or rotate) freely, as discussed herein. In some embodiments, the rotor may also decouple from the stator in a direction perpendicular to the plane of motion or rotation of the rotor magnet.

In some embodiments, the gap between the rotor and stator magnets may be held substantially constant during rotor movement, or may vary based on the design performance requirements. In some embodiments, the elastic resistance or force/distance characteristics (or stiffness or spring constant K) may be substantially linearly, similar to the linear region conventional spring, or it may be partially linear over certain operating ranges, or may be non-linear, or a combination thereof, based on the design performance requirements. In some embodiments, the gap between adjacent stator magnets may be the same, or may vary based on design performance requirements. In some embodiments, in the case of multiple rotor magnets, the gap between adjacent rotor magnets may be the same, or may vary based on design performance requirements.

Thus, the present disclosure may be used as a "torque-limiter" (for angular motion), which will not allow the input torque (or an angular input force) applied to an input shaft to exceed a predetermined maximum torque value (e.g., the magnetic decoupling torque). If the input torque exceeds the decoupling torque, the rotor will magnetically decouple from the stator (and enter the DSP) and thereby limit the shaft torque. A similar approach may be used for linear or translational (non-circular) movement, e.g., where the stator and rotor are configured to move along a linear or non-circular path, which may be referred to as an "input force limiter" or "translational force limiter".

The present disclosure also allows energy to be stored in the elastic state when the device is operating in the elastically stressed state position (SSP), similar to that of a conventional spring. Thus, the magnetically-coupled device of the present disclosure converts elastic potential energy to kinetic energy.

The magnetically-coupled device of the present disclosure may exhibit a linear force/distance response (based on known Hooke's law) over a certain operating range, like a conventional spring, or may have multiple different linear spring constants and/or multiple different force/distance response profiles over its operating range, or have a non-linear force/distance response profile over its operating range, or may have a combination of linear and non-linear response profiles over its operating range. In particular, the spring constant (K) value, or force/distance response, or "stiffness", of the magnetically-coupled at a given operating position may be determined by the gap distance between the rotor and stator magnets, the strength of the permanent magnets (or the aggregate magnetic field or flux strength of the magnets), the rotor and stator housing or mounting structure material (e.g., a steel housing may enhance magnetic field strength), and other factors.

The magnetically-coupled device of the present disclosure does not experience material fatigue or breakage like a conventional spring or coil, as there is no elastic material strain creating the spring effect, only a magnetic field strain (e.g., tension and compression). Some embodiments of the present disclosure provide a rotor and stator that are mechanically separate from each other, which allows spring-like action with no mechanical interaction (or wear) between the rotor and stator. In some embodiments, the gap between the rotor and stator magnets may vary based on the state or condition, e.g., the rotor-stator gap may widen when an input force exceeds the magnetic decoupling force or torque, and, in some embodiments, the gap may automatically reset to its original position when the input force goes below the limit, thereby allowing the shaft to spin more freely when in the decoupled state.

Accordingly, the present disclosure retains certain beneficial features of conventional springs, while avoiding the non-beneficial ones, and also enabling other more advanced arrangements, as discussed more herein.

Referring to FIGS. 1A and 1B, a magnetically-coupled device 100A according to embodiments of the present disclosure is shown in a side view in FIG. 1A and from a top view in FIG. 1B. The device 100A includes a plurality of stationary (or stator) magnets 102A, 102B, 102C (collectively identified as 102) and a movable (or rotor) magnet 104. The stationary magnets 102 and movable magnet 104 are permanent magnets. The stationary magnets 102 are fixed or disposed in or on a surface or material 111 along a stationary magnet path 106. The movable magnet 104 is movable along a moving magnet path 108. The stationary magnets 102 alternate in magnetic polarity along the stationary magnet path 106.

The first stationary magnet 102A (left magnet in FIG. 1A) has south pole polarity S on the side 103A facing the movable magnet 104, the second stationary magnet 102B (middle magnet in FIG. 1A) has north pole polarity N on the side 103B facing the movable magnet 104 and the third stationary magnet 102C (right magnet in FIG. 1A) has south pole polarity on the side 103C facing the movable magnet 104. Also, the stationary magnets 102 each have opposite magnetic polarities on different sides of the respective magnets 102A, 102B, 102C. The movable magnet 104 also has opposite polarity on different sides of the magnet 104. The bottom side 105A of the movable magnet 104 facing the stationary magnets 102 has south pole polarity S and the top side 105B facing away from the stationary magnets 102 has north pole polarity N. Also, there is a horizontal distance (or gap) 120 between the left end surfaces of the movable magnet 104 and stationary magnet 102A and a horizontal distance 122 between the right end surfaces of the movable magnet 104 and the stationary magnet 102C which may be equal.

There are gaps 107A, 107B between the adjacent stationary magnets 102A, 102B, 102C along the stationary magnet path 106. The distances of the gaps 107A, 107B are equal between each adjacent stationary magnet 102; however, the distances of the gaps 107A, 107B may be unequal in order to configure the system in a particular manner as is later discussed herein in greater detail. There is a fixed gap 107C between the movable magnet 104 and the top surface 103A, 103B, 103C (collectively 103) level of the stationary magnets 102. In some embodiments, the gap 107C is substantially zero (e.g. the surfaces may be touching or coated with a low friction coating, e.g. Teflon). In some embodiments, the gap 107C is created by a material, structure or support (not shown) between the bottom surface of the movable magnet 104 and the top surface 103 of the stationary magnets 102. The material or support surface may be substantially transparent to magnetic fields in order to minimize interference with magnetic forces between the magnetic fields of the magnets 102, 104. In some embodiments, the movable magnet 104 is mechanically held at the gap distance 107C away from the stationary magnets 102A, 102B, 102C, as discussed herein. In some embodiments, the gap 107C may be variable or may change state/value in certain conditions.

In the device 100A, there is a repulsive magnetic force 110 generated due to the matching polarity of the first stationary magnet 102A and bottom side 105A of the movable magnet 104 (south-south), an attractive magnetic force 112 due to the opposite polarities of the second stationary magnet 102B and the bottom side 105A of the movable magnet 104 (north-south) and a repulsive magnetic force 114 due to the matching polarity of the third stationary magnet 102C and the bottom side 105A of the movable magnet 104 (south-south). The position of the movable magnet 104 shown in FIGS. 1A and 1B may be considered an equilibrium state or equilibrium state position (ESP). In the equilibrium state, the sum of the horizontal forces acting on the movable magnet 104 are balanced (or zero) such that the movable magnet 104 is stationary.

Referring to FIG. 1C, in operation, an applied force AF may be applied to the movable magnet 104 in a direction substantially parallel to the movable magnet path 108. The applied force AF causes the movable magnet 104 to move a stress distance 116 from the equilibrium state position. In operation, the force applied to the movable magnet 104 may be solely in a direction that is parallel to the movable magnet path 108. However, a vector component of a force applied in the direction that is substantially parallel to the movable magnet path 108 may be considered the applied force AF. The configuration of the magnetically-coupled device 100A opposes the applied force AF. The horizontal component 110A of the repulsive force 110 between the first stationary magnet 102A and the movable magnet 104 increases as the movable magnet 104 moves (along the path 108) towards the first stationary magnet 102A due to "compression" of the matching (repelling) magnetic fields (i.e., the distance 120 between the first stationary magnet 102A and the movable magnet 104 decreases). The magnetic fields of the magnets 102A, 104 may be considered in a state of compression. Conversely, the horizontal component 112A of the attractive force 112 between the second stationary magnet 102B and the movable magnet 104 decreases slightly as the movable magnet 104 moves along the path 108 away from the second stationary magnet 102B due to "tension" (or stretching) of the opposite (attracting) magnet fields (i.e., the gap between the second stationary magnet 102B and the movable magnet 104 increases). In addition, the horizontal component of the repulsive force 114 between the third stationary magnet 102C and the movable magnet 104 decreases as the movable magnet 104 moves along the path 108 away from the stationary magnet 102C due to a decrease in compression of the matching magnetic fields 114; since the distance 122 between the movable magnet 104 and the third stationary magnet 102C is greater at the stress distance position 116 than the effective gap at the equilibrium state position. The magnetically-coupled device 100A may be considered to be in a "stressed" state or stressed state (or energy storage) position (SSP). In the stressed state, the horizontal component 110A of the repulsive force 110 between the first stationary magnet 102A and the movable magnet 104 is greater than the horizontal component 114A of the repulsive force 114 between the third stationary magnet 102C and the movable magnet 104.

When the applied force AF is removed, the device 100A will seek to return the movable magnet 104 to the equilibrium state position, i.e., the position shown in FIGS. 1A and 1B. The device 100A will seek to achieve the equilibrium state because the sum of the horizontal components of the magnetic forces 110A, 112A, 114A on the movable magnet 104 is not equal (or zero). In particular, the horizontal components of the repulsive force 110A between the first stationary magnet 102A and the movable magnet 104 in addition to the horizontal component of the attractive force 112A between the second stationary magnet 102B and the movable magnet 104 is greater than the horizontal component of the repulsive force 114A between the third stationary magnet 102C and the movable magnet 104. Similarly, when the applied force AF is decreased in strength, the movable magnet 104 will move along the path 108 in the direction of the equilibrium state position until the sum of the horizontal components of the forces 110A, 112A, 114A on the movable magnet 104 are equal to zero (i.e. the forces are balanced).

As shown in FIG. 1D, the applied force AF could also be applied in the opposite direction from the direction shown in FIG. 1C, but still substantially parallel to the direction of the movable magnet path 108. The position of the movable magnet 104 is shown in another stressed state in which the device 100A will seek to achieve the equilibrium state when the applied force AF is removed. Similarly, when the applied force AF is decreased in strength, the movable magnet 104 will move along the path 108 in the direction of the equilibrium state position until the sum of the horizontal components of the forces 110A, 112A, 114A on the movable magnet 104 are equal to zero (i.e. the forces are balanced).

It should be readily understood that the repulsive magnetic forces 110, 114 and the magnetic attractive force 112 can be selectively configured by choosing the appropriate magnet strength of each permanent magnet 102A, 102B, 102C, 104. Further, the magnet forces 110, 112, 114 can be selectively configured by adjusting the distances of the gaps 107A, 107B, 107C, 120, 122. The gaps 107A, 107B, 107C, 120, 122 may be permanently fixed or adjustable through known magnet gap adjustment mechanisms. The gaps 107A, 107B, 107C, 120, 122 may also be adjusted to be unequal distances so that the movable magnet 104 is more easily forced in one direction over the opposite direction if desired. The particular configuration of the magnets 102, 104 and gaps 107A, 107B, 107C, 120, 122 between magnets 102, 104 allows for the magnetic forces 110, 112, 114 to be selectively chosen in order to determine an overall spring constant (K) (e.g. distance/force applied; Hooke's law) for the magnetically-coupled device and/or spring constants between different equilibrium state positions within the magnetically-coupled device. The mass of the movable magnet 104 and/or a mass (or masses) attached to the movable magnet 104 may also contribute to the overall spring constant of the magnetically-coupled device 100A.

While the movable magnet 104 is shown as having a larger diameter than that of the stationary magnets 102 in the direction of the stationary magnet path 106 and/or movable magnet path 108, it should be readily understood that in some embodiments the movable magnet 104 may be the same size or smaller than the stationary magnets 102.

Referring to FIG. 1E, a magnetically-coupled device 100B is shown that is substantially the same as the magnetically-coupled device 100A shown in FIG. 1A except that the magnetically-coupled device 100B comprises seven (7) stationary magnets 102 instead of three (3). In the magnetically-coupled device 100B, the additional stationary magnets 102 allows for the movable magnet 104 to be moved to more than one equilibrium state. If the applied force AF (FIG. 1C) and the repulsive force 110A is great enough to overcome the attractive magnetic force 112A and the repulsive magnetic force 114A, the movable magnet can magnetically "break" or "decouple" from the magnet device seeking to return to the first equilibrium state position $ESP_1$, and instead seek to achieve an equilibrium state at the second or third equilibrium state positions $ESP_2$, $ESP_3$. Advantageously, the magnetic device 100B magnetically "breaking" or "decoupling" from seeking one equilibrium state to another equilibrium state does not cause any damage to the magnetically-coupled device 100B components. As discussed above, the magnetic force strength between the rotor and stator magnets can be selectively configured, which allows for the force required to magnetically break or decouple from one equilibrium state position $ESP_1$, $ESP_2$, $ESP_3$ to another equilibrium state position $ESP_1$, $ESP_2$, $ESP_3$ to be selectively configured. It should be understood that magnetically-coupled devices according to the present disclosure may have any number of a plurality of stationary magnets 102 and/or equilibrium state positions ESP.

In some embodiments, the magnetically-coupled device 100B may be configured such that the rotor-stator gap 107C between the movable magnet 104 and the stationary magnets 102 is adjusted when the movable magnet 104 breaks from seeking an equilibrium state position and may be referred to herein as the Decoupled State or Decoupled State Position (DSP). In some embodiments, the gap 107C increases to a sufficiently large degree so that the movable magnet 104 does not seek a new equilibrium state. The magnetically-coupled device 100B may be connected to a mechanism or controller that provides an indication to a user when the magnetically-coupled device 100B breaks (is in the DSP) and the rotor-stator gap 107C is adjusted, or be operatively connected to a mechanism or controller that turns on or turns off a device or operation if the magnetically-coupled device 100B indicates a breaking condition occurred. In such embodiments, the movable magnet 104 may advantageously function as a re-usable shear pin. Since the movable magnet 104 can be reset after reaching the DSP, an operator of a device having a magnetically-coupled device 100B can adjust the movable magnet 104 back to an operational position where the movable magnet 104 seeks an equilibrium state position, i.e., return the movable (or rotor) magnet 104 to a position where the rotor-stator gap 107C is substantially the same as it was prior to the decoupling condition.

It should be readily understood that in embodiments according to the present disclosure, the movable magnet 104 may not move along an exactly linear movable magnet path 108. In some embodiments, the movable magnet 104 may be configured to move along a non-linear path, such as, for example and without limitation, an arc path or serpentine, or other non-linear path.

Figure 1F:
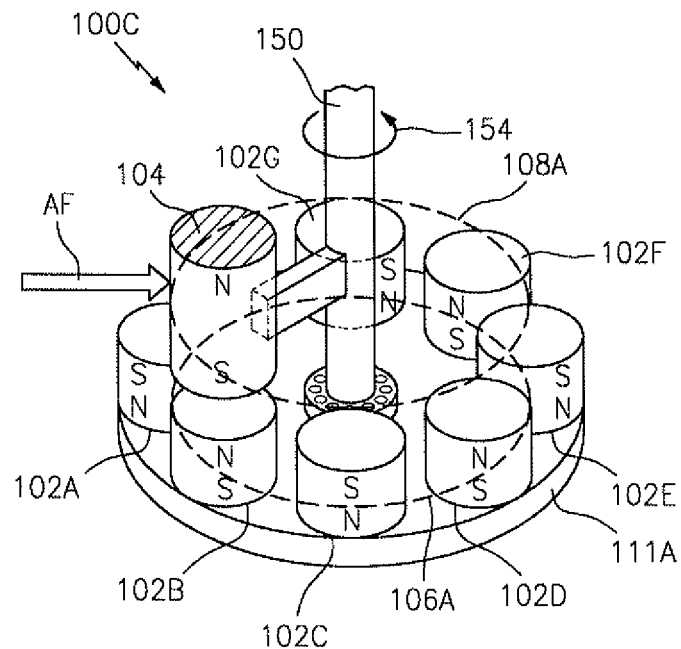
FIG. 1F is a side view of a magnetically-coupled device in accordance with embodiments of the present disclosure.
Figure 1G:
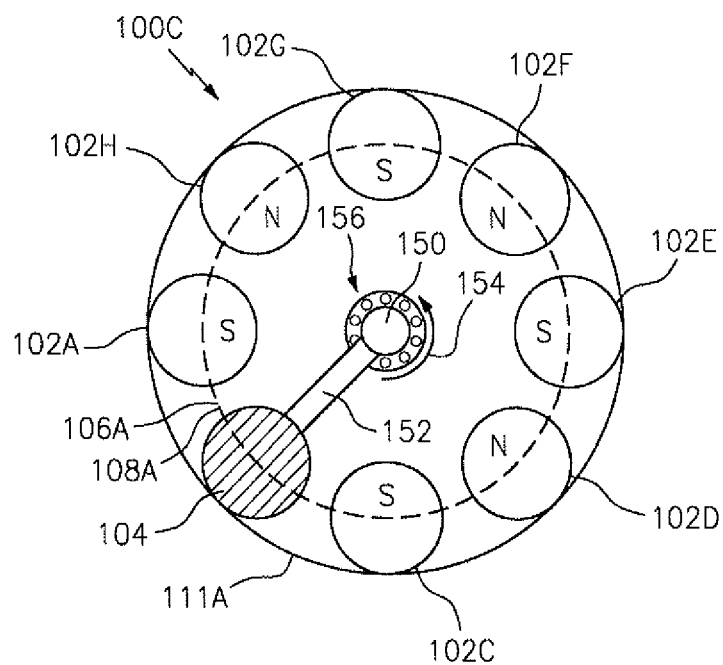
FIG. 1G is a top view of the magnetically-coupled device of FIG. 1F in accordance with embodiments of the present disclosure.

Referring to FIGS. 1F and 1G, a magnetically-coupled device 100C is shown from a side view in FIG. 1F and from top view in FIG. 1G. The magnetically-coupled device 100C is substantially similar to the magnetically-coupled devices 100A, 100B discussed above. However, in the magnetically-coupled device 100C, the stationary magnets 102 are arranged along a circular stationary magnet path 106A and, likewise, the movable magnet 104 is configured to move along a matching circular movable magnet path 108A. Otherwise, the function and operation of the magnetically-coupled device 100C is substantially the same. The movable magnet 104 can magnetically "break" or "decouple" between different equilibrium state positions when a horizontal applied force AF is applied to the movable magnet 104, thereby moving the magnet in a clockwise or counterclockwise direction along the circular path 108A of the movable rotor magnet 104.

Figure 1H:
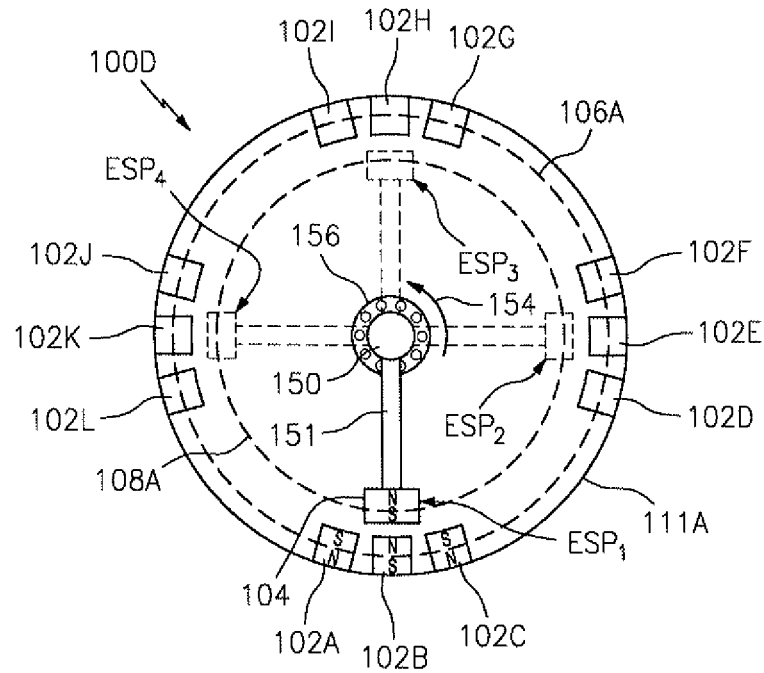
FIG. 1H is a top view of a magnetically-coupled device in accordance with embodiments of the present disclosure.

A magnetically-coupled device 100D is shown from a top view in FIG. 1H. The magnetically-coupled device 100D is substantially similar to the magnetically-coupled devices 100A, 100B, 100C discussed above. The magnetically-coupled device 100D is similar to the device 100C shown in FIGS. 1F and 1G in the respect that the stationary magnets 102 are arranged along the circular stationary magnet path 106A and, likewise, the movable magnet 104 is configured to move along a circular movable magnet path 108A and have arm 151 attached to the shaft 150. However, instead of the rotor magnet 104 (and the rotor path 108A) being on top of the stator magnets 102 (and the stator magnet path 106A), in this case, the circular path 108A of the rotor magnets 104 is located concentrically inside the circular path 106A of the stator magnets 102. Otherwise, the function and operation of the magnetically-coupled device 100D is substantially the same. The movable magnet 104 can magnetically "break" or "decouple" between different equilibrium state positions ESP when an applied force AF (or rotational input torque) is applied to the side of the movable rotor magnet 104, thereby moving the rotor magnet 104 in a clockwise or counterclockwise direction along the circular movable rotor magnet path 108A.

Figure 1I:
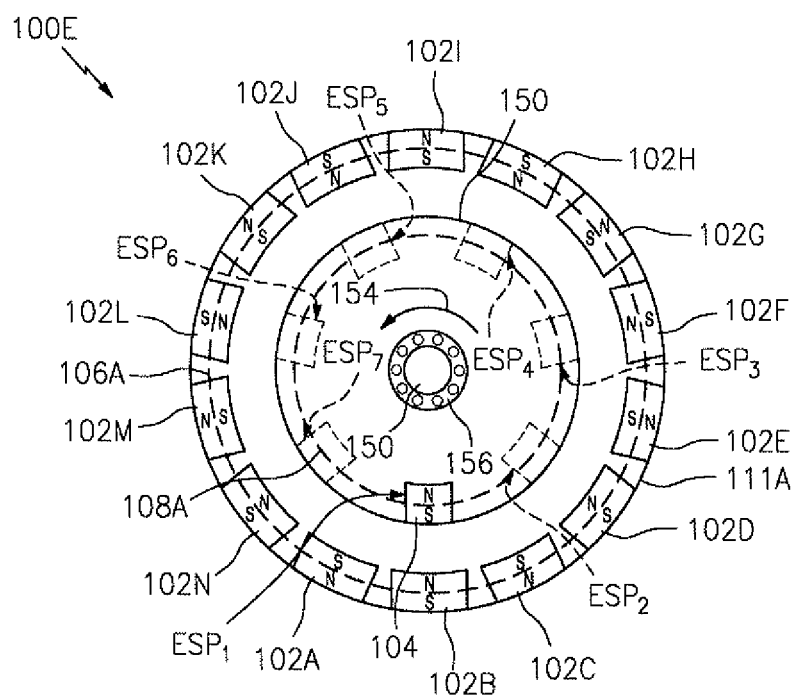
FIG. 1I is a top view of a magnetically-coupled device in accordance with embodiments of the present disclosure.

A magnetically-coupled device 100E is shown from a top view in FIG. 1I. The magnetically-coupled device 100E is substantially similar to the magnetically-coupled devices 100A, 100B, 100C, 100D discussed above. The magnetically-coupled device 100E is similar to the device 100D shown in FIG. 1H in the respect that the stationary (stator) magnets 102 are arranged along circular stationary (stator) magnet path 106 and, likewise, the movable (rotor) magnet 104 is configured to move along a circular movable magnet path 108. However, in this case, the stationary magnets 102 are disposed on a structure (e.g., disc or plate or circular cylindrical casing or housing). Otherwise, the function and operation of the magnetically-coupled device 100E is the same. The movable magnet 104 can magnetically "break" or "decouple" between different equilibrium state positions ESPs, when a rotational applied force AF is applied to the side of the movable magnet 104, thereby moving the rotor magnet 104 in a clockwise or counterclockwise direction along the circular movable (rotor) magnet path 108A.

Figure 1J:
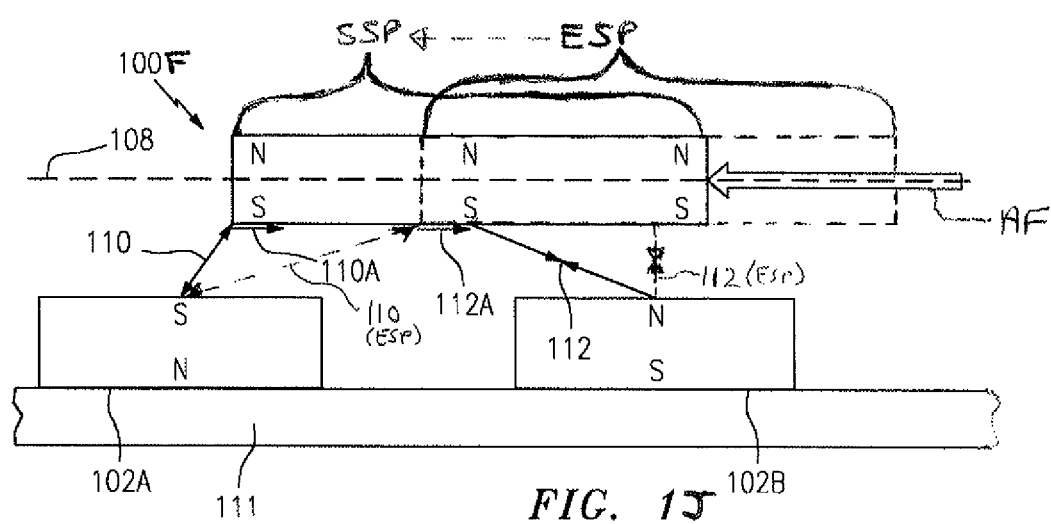
FIG. 1J is a side view of a magnetically-coupled device in accordance with embodiments of the present disclosure.

Referring to FIG. 1J, while the equilibrium state positions of magnetically-coupled devices have been shown and described as having a movable magnet 104, which is movable with respect to three stationary magnets 102, it should be readily understood that the same principles and applications may be used for a magnetically-coupled device having only two stationary magnets, or two (or more) stationary magnets for each equilibrium state position. In particular, a magnetically-coupled device 100F is shown in FIG. 1J that is substantially the same as the magnetically-coupled device 100A of FIGS. 1A and 1B. However, the magnetically-coupled device 100F includes only two stationary magnets 102A, 102B.

Referring to FIG. 1J, magnetically-coupled devices described herein may also be used in applications where an applied force AF is primarily only in one direction and which primarily operates in the ESP and SSP positions. For instance, the magnetically-coupled device 100F may be configured to receive the applied force AF in the direction of the rotor movement path 108 from right to left and in the direction of the stationary (or stator) magnet 102A, causing the repulsive force 110, i.e., in a direction that pushes the movable magnet 104 away from the first stator magnet 102A and towards the second stator magnet 102B to be compressed, and the attractive force 112 between the rotor magnet 104 and the stator magnet 102B to be stretched or in tension (or be in the stressed state position SSP), the magnet 102 having an upper surface 103A (FIG. 1A) providing the repulsive force 110 with the same magnetic polarity as the bottom surface 105A (FIG. 1A) of the movable magnet. Conversely, when the applied force AF is removed or reduced the rotor magnet 104 will move back toward the ESP, as described herein with the device 100A (FIG. 1A).

In embodiments according to the present disclosure, the magnetically-coupled devices may be used in an application where the movable magnet 104 is connected to a shaft 150 by an arm 151, the shaft 150 being rotatable about a shaft axis extending in a longitudinal direction of the shaft 150. In some embodiments, the shaft 150 may be connected to one side of a bearing 156, and the other side of the bearing 156 is connected to the structure 111A supporting the stationary magnets 102. For example, the magnetically-coupled devices 100C (FIGS. 1F and 1G), 100D (FIG. 1H) can convert the mechanical kinetic energy provided by rotation 154 of the shaft 150 into potential energy of the magnetically-coupled device 100C, 100D being actuated (or rotated or torqued) to the elastically stressed state position (SSP) discussed herein. The magnetically-coupled device 100C, 100D converts the elastic potential energy back to mechanical kinetic energy when the movable magnet 104 through arm 152 is brought back to an equilibrium state position, which thereby provides shaft 150 rotation 154, i.e., kinetic energy. While the movable magnet 104 is shown as being connected to the shaft 150 by an arm 152, it should be readily understood that the arm 152 may be fixed to the shaft 150 through any known connection structures. In some embodiments, instead of the arm 152 the stationary or stator magnets 102 may be attached or disposed on or in a plate or disc or a cylinder that rotates with shaft rotation. The embodiments of FIGS. 1F and 1G may be cylindrical magnets for both the stationary magnets (or "stator") 102 and the movable magnet (or "rotor") 104 and may use cylindrical "end face" forces between the rotor 104 and the stator 102.

It should be readily understood that there may be a plurality of movable (or rotor) magnets 104 in a magnetically-coupled device 100 according to the present disclosure. For example, in the magnetically-coupled devices 100C, 100D there may be an arm 152 for each movable magnet 104. In the magnetically-coupled device 100E (FIG. 1I), there may be multiple movable magnets 104 arranged about the shaft 150. In the embodiments where there are a plurality of movable magnets 104, the movable magnets 104 may be spaced from each other at each equilibrium state position ESP such that the movable magnets 104 may simultaneously be in equilibrium state positions. In some embodiments, there may be a movable magnet 104 for each possible equilibrium state position ESP.

Figure 2A:
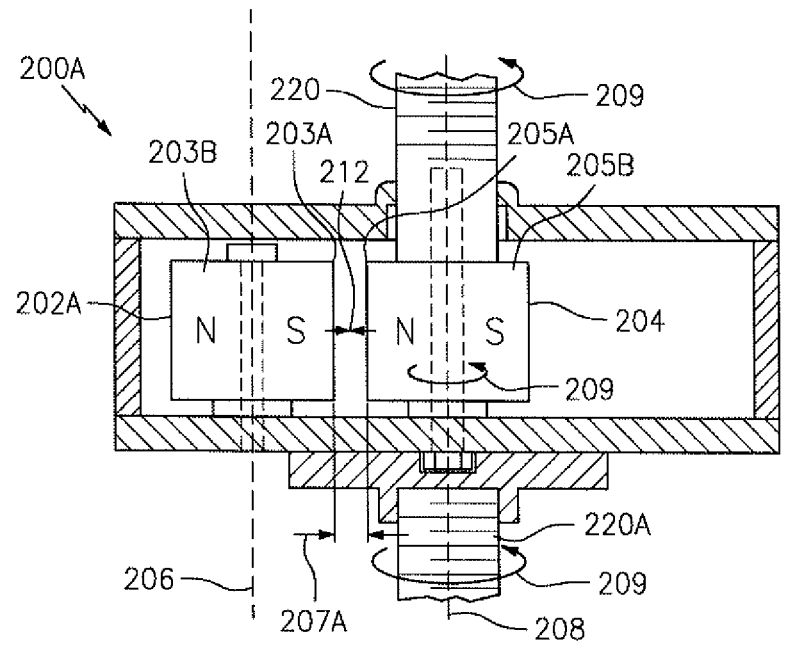
FIG. 2A is a side view of a two-magnet magnetically-coupled device in accordance with embodiments of the present disclosure.
Figure 2B:
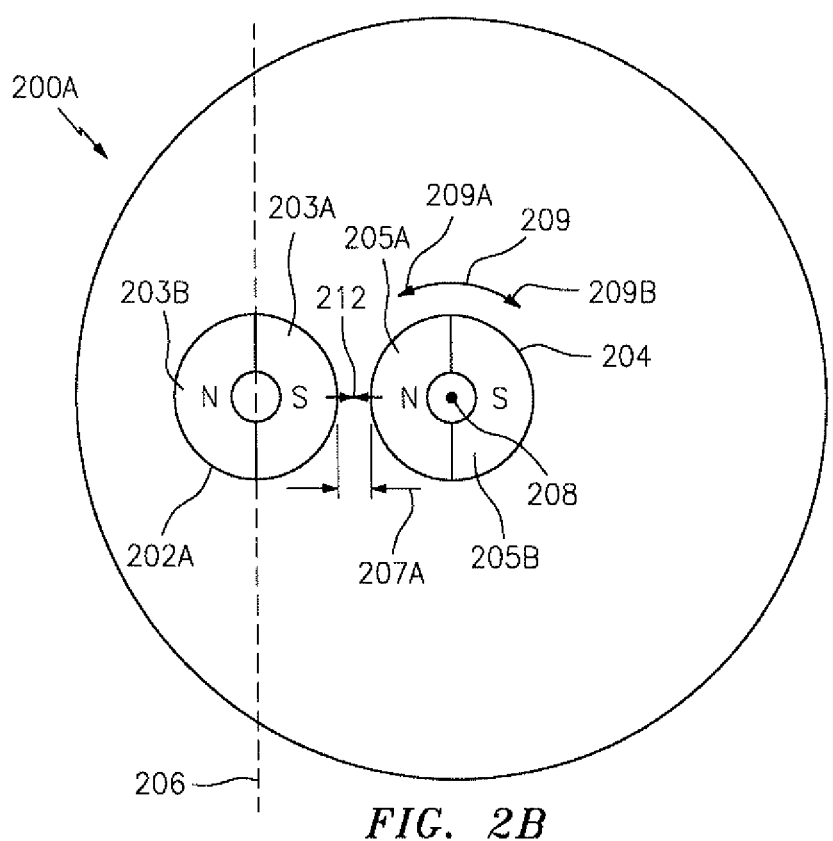
FIG. 2B is a top view of the magnetically-coupled device of FIG. 2A in accordance with embodiments of the present disclosure.

Referring to FIGS. 2A and 2B, a magnetically-coupled device 200A using diametrically magnetized cylindrical stator and rotor magnets and angular "side-shear" force between the rotor magnet and the stator magnet is shown from a side view in FIG. 2A and from a top view in FIG. 2B. The device 200A includes a single stationary magnet (or stator) 202A and a movable magnet (or rotor) 204. The stationary magnet 202A and movable magnet 204 are permanent magnets. The stationary magnet 202A is arranged on a plane 206 such that the stationary magnet 202A has north pole polarity on one side 203B of the plane 206 (left side in FIG. 2A view) and south pole polarity on the opposite side 203A of the plane 206 (right side in FIG. 2A) facing the rotor 204. The rotor 204 is separated from the stator 202A by a rotor-stator gap 207A.

The rotor 204 is configured to move or rotate 209 (FIG. 2B) about a movable magnet axis (or rotor axis) 208 in either direction. The rotor 204 has one side 205A having north pole N polarity (left side in FIG. 2A) and a second opposite side 205B having south pole S polarity (right side in FIG. 2A).

In the device 200A, there is an attractive force 212 generated due to the opposite polarities of the stator 202A side 203A (south) facing the rotor 204 and the rotor side 205A (north) facing the stator 202A. The position of the movable magnet 204 shown in FIGS. 2A and 2B may be considered an equilibrium state or equilibrium state position (ESP). In the equilibrium state, the sum of the forces acting on the rotor 204 are zero such that the rotor 204 remains stationary, i.e., the sum of the forces in a rotational direction 209 about the movable magnet axis 208 are zero.

There may be a center rotor shaft 220 (or input shaft), which receives input force or input torque, is attached to the movable rotor magnet 204, such that when the input shaft 209 is rotated 209 by an input force or torque, the rotor magnet 204 also turns. The rotor shaft 220 passes through the housing via a flange bearing, e.g., a Cleveland Freeway sealed flanged shaft ball-bearing, e.g., having an outer diameter (OD) of about 1.5 inches, an inner diameter (ID) of about ⅝ inches, and a thickness of about 7/16 inches, which provides ease of rotation (low friction) and lateral support for the rotor shaft 220. Other dimensions and bearing types may be used if desired. Instead of a bearing, a bushing or cylindrical lining may be used to provide low friction and low wear inside the hole that the input rotor shaft 220 passes through. The bushing may use a bronze liner, plastic liner, O-Ring, Teflon® coating, or the like, to provide desired low-friction rotation. Other structural components may be used to provide ease of rotation (low friction rotation) and lateral support for the input rotor shaft 220 if desired. The input shaft 220 may have a diameter of about ⅝ inches and may be threaded, and may have a ¼ inch threaded center hole to receive a ¼ inch—20 bolt (rotor bolt), which passes through the bottom of the housing and through the center of the rotor magnet 204 to attach the rotor to the rotor 204 shaft 220 and to provide more lateral support for the rotor magnet and a rotational axis around which the rotor magnet 204 may rotate. The cylindrical magnets 202A, 204 may each have a longitudinal hole along the length of the cylinder which may be used to receive the ¼" vertical bolts (stator bolt and rotor bolt) used to hold the magnets 202A, 204, respectively, in place laterally (horizontally) and/or to allow the rotor magnet 204 to rotate about the vertical rotational axis 208. In this case, the stator magnet 202A would be fixed in position (laterally, vertically and rotationally) and the rotor magnet 204 would be fixed in position laterally (horizontally) and vertically, and allowed to rotate as indicated by the arrows 209 (as described herein) about the vertical rotor axis 208 and rotor bolt through the center of the rotor magnet 204.

Also, there may be a washer or spacer or locking nuts underneath the rotor magnet 204 and on the ¼" rotor bolt, between the bottom of the rotor magnet 204 and the housing bottom, that allows the rotor to spin or rotate 209 about the vertical axis 208. Also, there may also be a washer or spacer underneath the stator magnet 102 and on the ¼" stator bolt, between the bottom of the stator magnet 102 and the housing bottom, which allows the stator to be vertically positioned at substantially the same height as the rotor magnet.

An output shaft 220A may be connected to the bottom plate of the housing, to which an output energy receiver (e.g., alternator or the like) may be connected. The bottom housing plate may have a mounting flange, e.g., a pipe hanger flange, having a threaded socket, e.g., an M16-1.5 (metric-thread pitch), into which the output shaft 220A is threaded into.

The housing may be made of a ferrous material, e.g., steel, or other ferrous material that conducts magnetic fields. Using a steel housing for embodiments described herein provides at least two benefits, including: (1) limits flux leakage outside the housing to nearby environment, acting like a magnetic field shield; and (2) acts as a flux conductor or "keeper", which magnifies the maximum magnetic flux of the magnet to be about ⅓ stronger than the magnet rating in the face of the magnet opposite the housing plate, by focusing the magnetic field.

Also, the cylindrical magnets may be Grade N42 Neodymium, diametrically magnetized cylindrical (or disc) magnets, made by K&J Magnetics, Part No. RX04X0DIA, having about 1 inch OD, about ¼ inch ID, and about 1 inch long (or thick). Also, the air gap between the cylindrical magnets may be about 1/10 inch airgap. Other dimensions and shapes may be used if desired depending on the design requirements. As discussed herein, the cylindrical magnets described herein may have longitudinal holes (e.g., about ¼" diameter) along the length of the cylinders, which may be used to receive bolts to hold the magnets in place, to attach them to a plate or housing, and/or to allow the magnet to rotate around (rotational axis). Other air gaps may be used if desired. Instead of bolts, the stator magnets may be glued to or embedded into the housing or plates to secure the magnets to the housing or plates if desired.

Figure 2C:
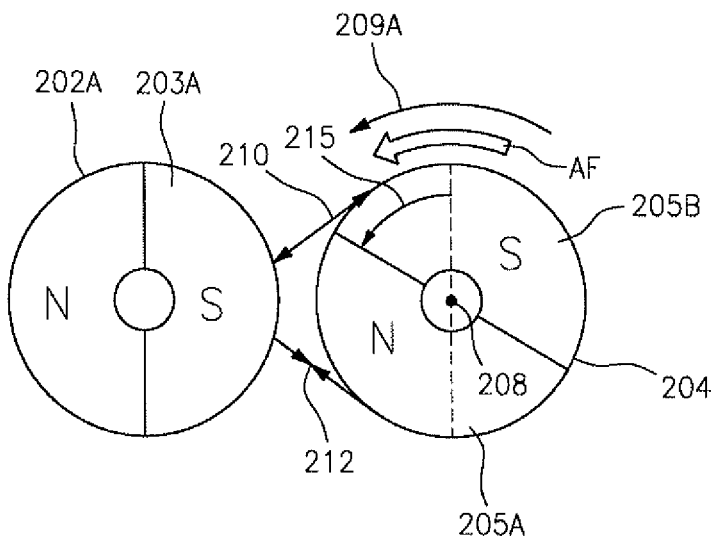
FIG. 2C is a top view of the magnetically-coupled device of FIG. 2A in operation in accordance with embodiments of the present disclosure.

Referring to FIG. 2C, in operation, rotational applied force AF is applied to the movable magnet 204 in the rotational direction 209 about the movable magnet axis 208, which causes the movable magnet 204 to rotate by a predetermined angle 215 about the movable magnet axis 208. In FIG. 2C, the applied force AF is in a counterclockwise direction 209A about the movable magnet axis 208. The applied force AF may be provided by the input shaft 220 (FIG. 2A) connected to the movable magnet 204. When rotated as shown in FIG. 2C, the configuration of the magnetically-coupled device 200A opposes the rotational applied force AF. The attractive force 212 between the opposite polarity sides 203A, 205A of the stationary magnet 202A and the movable magnet 204 respectively, is put in tension and seeks to resist or counteract the rotation of the movable magnet 204 from the equilibrium state position (ESP). In addition, simultaneously, there is a repulsive force 210 between the south side 203A of the stator magnet 202 and the south side 205B of the rotor magnet 204, which is put in compression and also acts to resist or counteract the rotation of the rotor magnet 204, as the device is in the elastically stressed state position (SSP), as described herein.

Figure 2D:
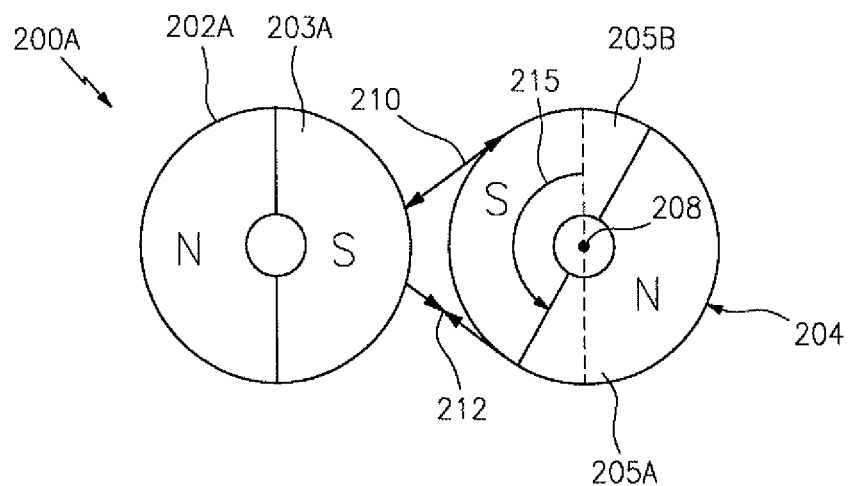
FIG. 2D is a top view of the magnetically-coupled device of FIG. 2A in operation in accordance with embodiments of the present disclosure.

Referring to FIG. 2D, as the movable (rotor) magnet 204 rotates further (and the angle 215 approaches 180 degrees), the side 205B having south pole S polarity is brought closer to the matching south pole S polarity side 203A of the stationary magnet 202A, which generates a stronger repulsive force 210 as the repulsive force 210 is compressed, while the attractive force 212 is put in greater tension and decreases. The magnetically-coupled device 200A in FIG. 2D may also be considered in the elastically stressed state or the elastically stressed state position (SSP).

When the applied force AF is removed (or decreased in strength), the device 200A will seek to (or be biased to or attempt to) return the movable magnet 204 to the equilibrium state position (ESP), i.e., the position shown in FIGS. 2A and 2B. The sum of the repulsive force 210 and attractive force 212 is great enough to overcome any frictional opposing forces present in the rotational configuration of the movable magnet 204.

Similar to the magnetically-coupled devices 100A, 100B, 100C, the magnetic device 200A would function substantially the same when the applied force AF is applied in the opposite direction, i.e., a clockwise direction. The repulsive force 210 and attractive force 212 would similarly seek to return the movable magnet 204 to the equilibrium state position (ESP).

Similar to the magnetic device 100B, if the applied force AF were great enough to overcome the repulsive force 210 and attractive force 212, the movable magnet 204 can magnetically "break" or "de-couple" such that the movable magnet 204 rotates about the movable magnet axis 208 until it recouples and seeks to return to the ESP by rotating a full revolution(s) (e.g. 360°, 720°, etc.). Thus, even when the movable magnet 204 de-couples, the magnetically-coupled device 200A will seek to return the movable magnet 204 to the equilibrium state position. Advantageously, the movable magnet 204 may rotate any number of times in either direction of the rotational direction 209. In other words, the movable magnet may move 360° or more in a first rotational direction 209A (counterclockwise) and/or 360° or more in a second rotational direction 209B (clockwise).

A difference between the magnetically-coupled device 100B shown in FIG. 1E and the magnetically-coupled device shown in FIGS. 2A-2D is that when the movable magnet 104 of the device 100B de-couples, the movable (rotor) magnet will move to an equilibrium state position (ESP) that is in a spatially different location from the starting equilibrium state position (i.e., the center of the movable magnet translates or moves or changes physical location when in motion). In contrast, when the movable magnet 204 of the device 200A de-couples, center of the movable magnet does not translate or moves or changes physical location as it rotates about its axis when in motion, and thus the movable magnet will return to the equilibrium state position (EPS) that is spatially the same location since the movable magnet 204 rotates about the movable magnet axis 208. Advantageously, as with the other embodiments, the movable magnet 204 may decouple any number of times without damaging the magnetically-coupled device 200A.

Similar to the magnetically-coupled devices 100A, 100B discussed above, it should be readily understood that the repulsive magnetic force 210 and the magnetic attractive force 212 can be selectively configured by choosing the appropriate magnet strength of each permanent magnet 202, 204. Further, the magnet forces 210, 212 can be selectively configured by adjusting the distances of the gap 207A. The rotor-stator gap 207A may be permanently fixed or adjustable through known magnet gap adjustment mechanisms.

Figure 2E:
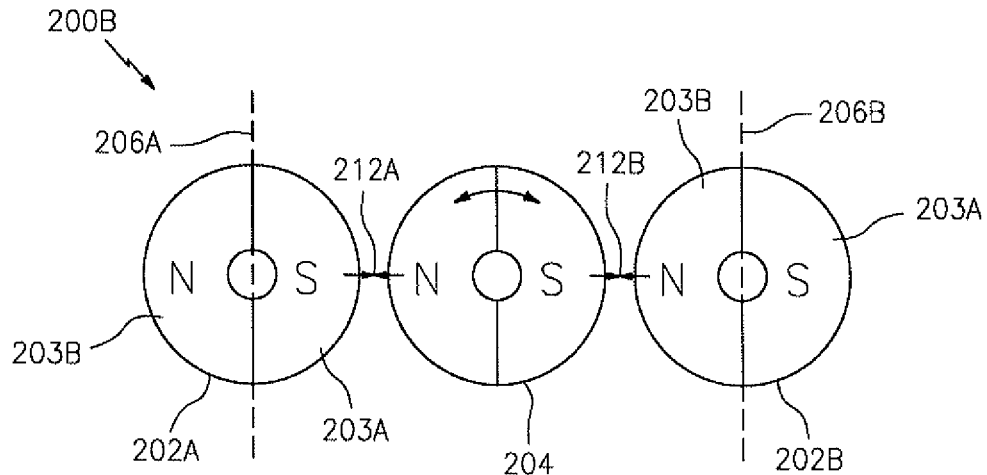
FIG. 2E is a top view of a three-magnet magnetically-coupled device in accordance with embodiments of the present disclosure.

Referring to FIG. 2E, a top view of a magnetically-coupled device 200B is shown in accordance with embodiments of the present disclosure. The magnetically-coupled device 200B is substantially the same as the magnetically-coupled device 200A of FIG. 2A except that it includes an additional stator magnet 202B. In particular, the first stationary (or stator) magnet 202A is arranged on a first plane 206A such that the first stationary magnet 202A has a north pole polarity on one side 203B of the first plane 206A (left side in FIG. 2E) and south pole polarity on the opposite side 203A of the first plane 206A facing the rotor 204. In addition, the magnetically-coupled device 200B of FIG. 2E includes the additional stationary (or stator) magnet 202B arranged on the opposite side of the rotor magnet 204 from the first stator magnet 202A. The additional stator magnet 202B is arranged on a second plane 206B such that the second stationary magnet 202B has a north pole polarity on one side 203B facing the rotor 204 (left side in FIG. 2E) and south pole polarity on the opposite side 203A of the second plane 206B. The second stator magnet 202B is arranged to have the same rotor-stator gap distance as the first gap 207A to provide symmetrical forces on the rotor. Different rotor-stator gap distances may be used if desired to adjust or use different aggregate forces if desired, depending on the design requirements.

Figure 2F:
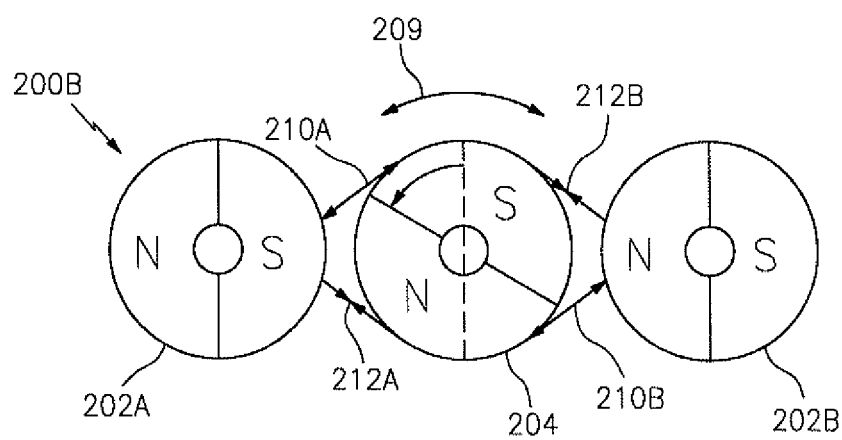
FIG. 2F is a top view of the magnetically-coupled device of FIG. 2E in operation in a stressed state position in accordance with embodiments of the present disclosure.
Figure 2M:
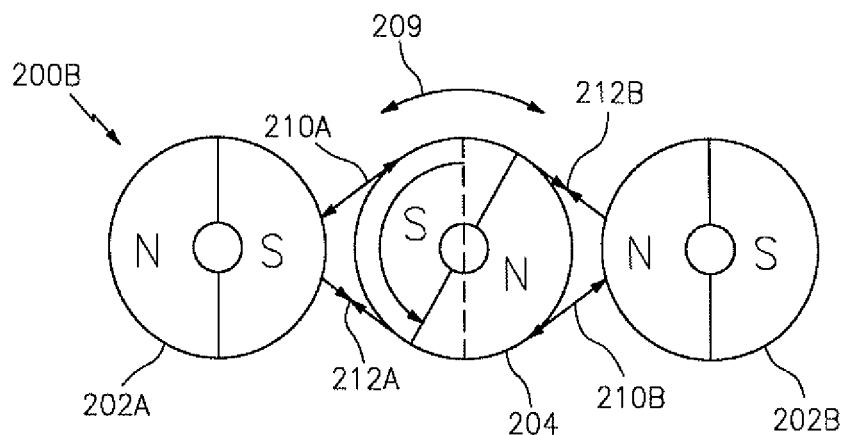
FIG. 2M is a top view of the magnetically-coupled device of FIG. 2E in operation in a stressed state position in accordance with embodiments of the present disclosure.

Referring to FIG. 2F and FIG. 2M, in operation, rotational force AF is applied to the movable magnet 204 in the rotational direction 209. The operation of the magnetically-coupled device 200B is substantially the same as the operation of the magnetically-coupled device 200A discussed above in connection with FIGS. 2C and 2D. A difference is that the magnetically-coupled device 200B has an additional repulsive magnetic force 210B and an additional attractive force 212B due to the additional stationary (stator) magnet 202B, which would increase the magnetic forces on the rotor 204 (which resist rotor rotation) and thus make the magnetically-coupled device more "stiff" than that of FIGS. 2C and 2D (using the same magnets and gaps). Also, the structural support and connection to the housing for the second stator magnet may be the same as that shown in FIG. 2A for the first stator magnet 202A, but located on the right side of the rotor 204.

Figure 2G:
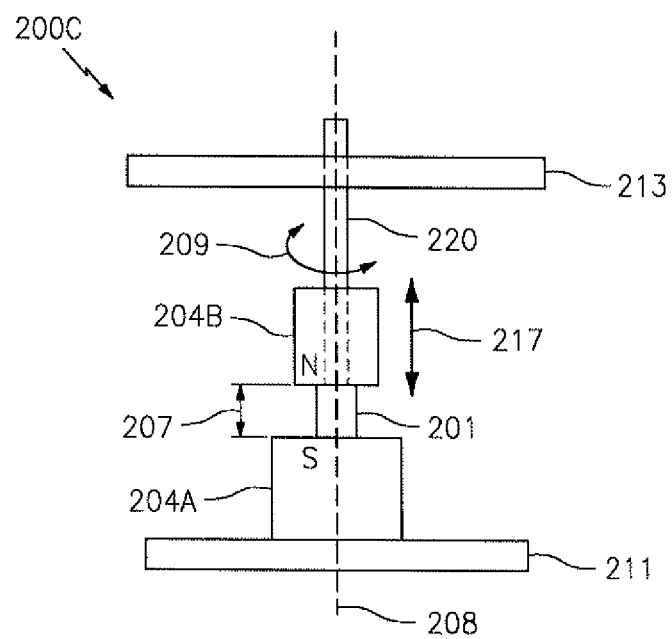
FIG. 2G is a side view of a magnetically-coupled device in accordance with embodiments of the present disclosure.

Referring to FIG. 2G, a side view of a magnetically-coupled device 200C is shown in accordance with embodiments of the present disclosure. The magnetically-coupled device 200C includes a first movable magnet 204A and a second movable magnet 204B. The first movable magnet 204 is arranged or disposed on a structure 211. The first movable magnet 204A is separated from the second movable magnet 204B by a spacer 201, which provides a rotor-stator gap 207 equal to the spacer 201 height. The first movable magnet 204A is connected to a shaft 220 and is configured to rotate with the shaft 220 about a movable magnet axis 208 in either direction in a rotational direction 209. The second movable magnet 204B is arranged to move in a sliding direction 217 parallel to the movable magnet axis 208. The shaft 220 extends through the second movable magnet 204B, through the spacer 201 and into the first movable magnet 204A. The shaft 220 also extends through a stop element or plate 213 arranged above the second movable magnet 204B.

Figure 2H:
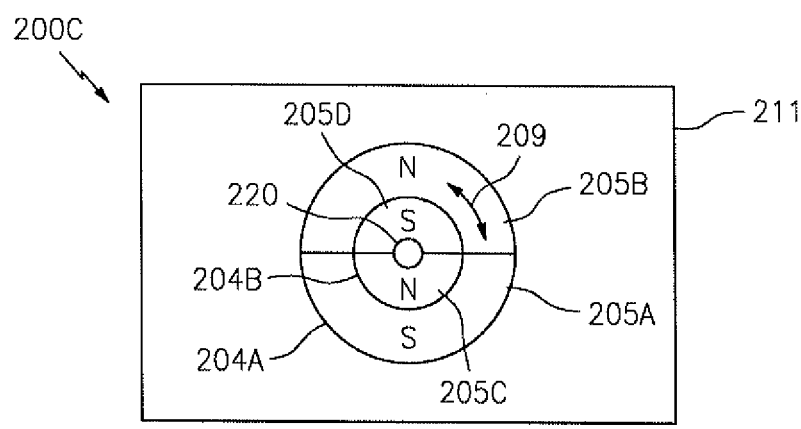
FIG. 2H is a top view of the magnetically-coupled device of FIG. 2G in accordance with embodiments of the present disclosure.

Referring to FIG. 2H, a top view of the magnetically-coupled device 200C is shown with the stop element 213 removed. The first movable magnet 204A is diametrically magnetized (i.e., magnetized through the diameter) such that the end of the first movable magnet 204A facing the second movable magnet 204B has a south pole S polarity side 205A and a north pole N polarity side 205B. The second movable magnet 204B is also diametrically magnetized and has a north pole N polarity side 205C and a south pole S polarity side 205D. As shown in FIG. 2H, the magnetically-coupled device 200C is in an equilibrium state position (ESP) where the opposite polarity (N-S, S-N) (attracting) sides of the movable magnets 204A, 204B are closest to each other.

Figure 2I:
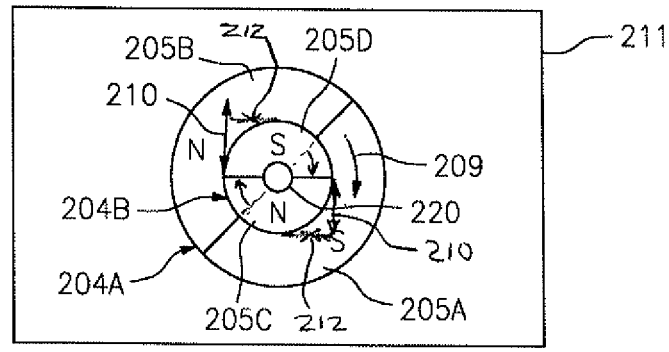
FIG. 2I is a top view of the magnetically-coupled device of FIG. 2G in operation in accordance with embodiments of the present disclosure.
Figure 2J:
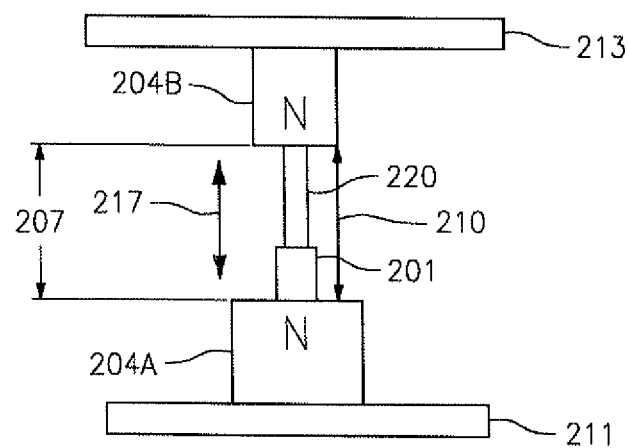
FIG. 2J is a side view of the magnetically-coupled device of FIG. 2G in operation in accordance with embodiments of the present disclosure.

Referring to FIG. 2I and FIG. 2J, in operation, when a clockwise rotational applied force 209 AF is applied (counterclockwise in FIG. 2I) to the shaft 220 and/or the first movable magnet 204A, the first movable magnet 204A rotates relative to the second movable magnet 204B. The second movable magnet 204B will experience repulsive magnet forces 210 and attractive magnet forces 212 that are compressed and in tension, respectively, as discussed above in connection with other embodiments, e.g., the magnetically-coupled device 200A of FIG. 2A. Thus, the second movable magnet 204B will seek the equilibrium state position (ESP) when the applied force AF 209 is removed or decreased in strength, as discussed herein.

Referring to FIG. 2J, during operation, when the movable magnet 204 rotates to a certain extent, the matching (opposing) polarity sides of the second movable magnet 204B will be close enough to force the second movable magnet 204B away from the first movable magnet 204A in the sliding direction 217 until the second movable magnet 204B comes to rest on the stop element 213, thereby increasing the gap (or distance) 207 between the first movable magnet 204A and the second movable magnet 204B. Thus, the first and second movable magnets are in a decoupled state position (DSP). After further rotation of the first movable magnet 204A, the repulsive (or opposing) magnetic force 210 will decrease and/or the attractive force 212 will increase such that the second movable magnet 204B is brought back to rest on the spacer 201 at the equilibrium state position (ESP).

In the embodiment of FIG. 2G, the first movable magnet 204A is shown as being larger in width (horizontal direction in FIG. 2G) than the second movable magnet 204B. In some embodiments, the first movable magnet 204A is the same size as the second movable magnet 204B or smaller than the second movable magnet 204B. In some embodiments, there may be no stop element 213, in which case the second movable magnet 204B will be forced away from the first movable magnet 204A until the sum of the repulsive magnetic force 210 and the force due to gravity is zero (or if the device is arranged in a direction perpendicular to the force of gravity, until the repulsive magnetic force 210 is unable to overcome the frictional force(s) resisting the sliding movement of the second movable magnet 204B).

It should be readily understood that the magnetically-coupled device 200C of FIG. 2G can be configured in many different ways. For example, and without limitation, in some embodiments the first movable magnet 204A could be arranged to rotate with the shaft 220 rotation and the second movable magnet 204B instead be configured as a stationary (stator) magnet and, thus, during operation the first movable magnet 204A would rotate and move in the sliding direction 217 (in such embodiments the shaft 220 may be configured to displace in the sliding direction 217 with the first movable magnet 204A as well). In some embodiments, the magnetically-coupled device 200C could be configured so that the second movable magnet 204B rotates and/or slides in the sliding direction 217 and the first movable magnet 204A is configured as a stationary (stator) magnet. In some embodiments, the maximum (and/or minimum) gap 207 between the magnets 204A, 204B is set by a locking element (e.g., dual locking bolts) connected to (or threaded on) the shaft 220 and arranged on the opposite side of the stop element 213 from the magnets 204A, 204B. Also, instead of the spacer there may be a locking elements to set the minimum gap 207.

Figure 2K:
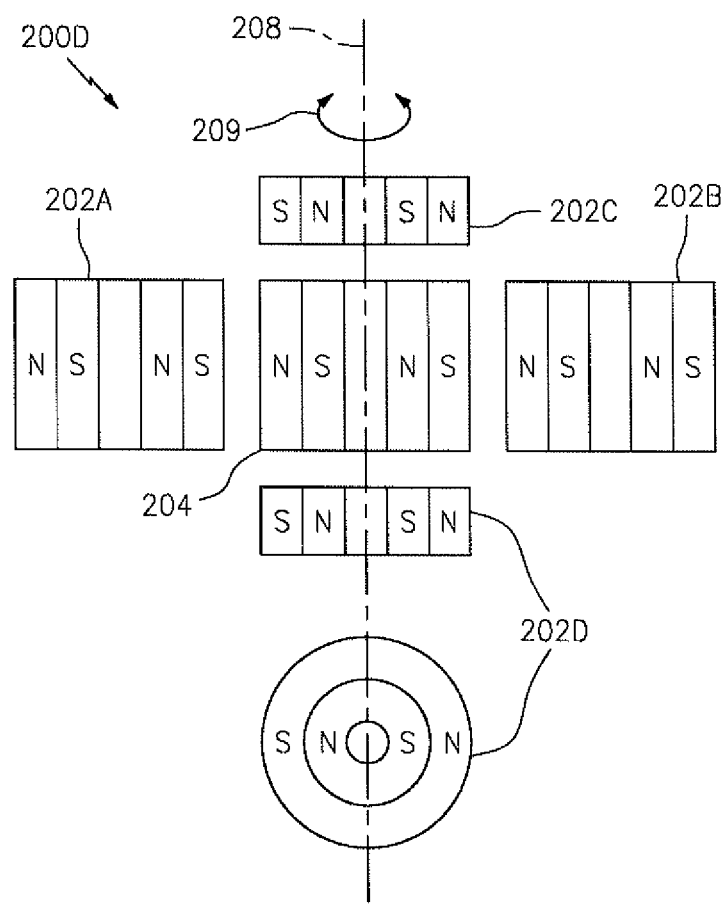
FIG. 2K is a side view of a magnetically-coupled device in accordance with embodiments of the present disclosure.

Referring to FIG. 2K, a side view of a magnetically-coupled device 200D is shown from a side view according to embodiments of the present disclosure. The magnetically-coupled device 200D includes four stationary magnets (or stator magnets), a first stationary magnet 202A, a second stationary 202B, a third stationary magnet 202C and a fourth stationary magnet 202D (collectively 202) and a movable magnet (or rotor) 204. The rotor 204 is configured to rotate about a movable magnet axis (or rotor axis) 208 in a rotational direction 209. The first stationary magnet 202A and the second stationary magnet 202B are arranged on opposite sides of the movable magnet 204 in a direction perpendicular to the movable magnet axis 208. The third stationary magnet 202C and the fourth stationary magnet 202D are arranged on opposite sides of the movable magnet 204 in a direction parallel to the movable magnet axis 208 and, thus, the third and fourth stationary magnets 202C, 202D may be considered "basal" (or base) magnets. This arrangement of the magnetically-coupled device 200D lends itself well for both full rotational and partial angular displacement of the movable magnet 204. The magnets may be diametrically cylindrical magnets also having inner and outer concentrically magnetized regions, thus, there are two different dimensions of magnetic interactions in this embodiment. In some embodiments, the magnets may be diametrically cylindrical magnets like that used in FIG. 2A without concentrically magnetized regions.

In operation, when the movable magnet 204 is rotated about the movable magnet axis 208 due to an applied force applied to the movable magnet or to a shaft which the movable magnet 204 is connected with, the movable magnet 204 will experience repulsive (or opposing) magnetic forces and attractive forces due to the matching (opposing) and opposite (attracting) magnetic field sides of the magnets as discussed above in connection with the embodiments of FIGS. 2A-2J. As shown in FIG. 2K, the movable magnet 204 is in an equilibrium state position (ESP). When in a stressed state position (SSP) due to rotation about the movable magnet axis 208, the movable magnet 204 will seek to return to the equilibrium state position (ESP) due to the repulsive magnetic forces in the direction of movement (being under compression) and the attractive magnetic forces (being under tension) according to principles as discussed above.

The movable magnet 204 can rotate in either direction in the rotation direction 209 about the movable magnet axis 208, and can rotate any number times, i.e., the movable magnet 204 can break or decouple from the equilibrium state position (ESP) any number of times and return to the equilibrium state position (ESP) without any damage or deformation of components.

Figure 2L:
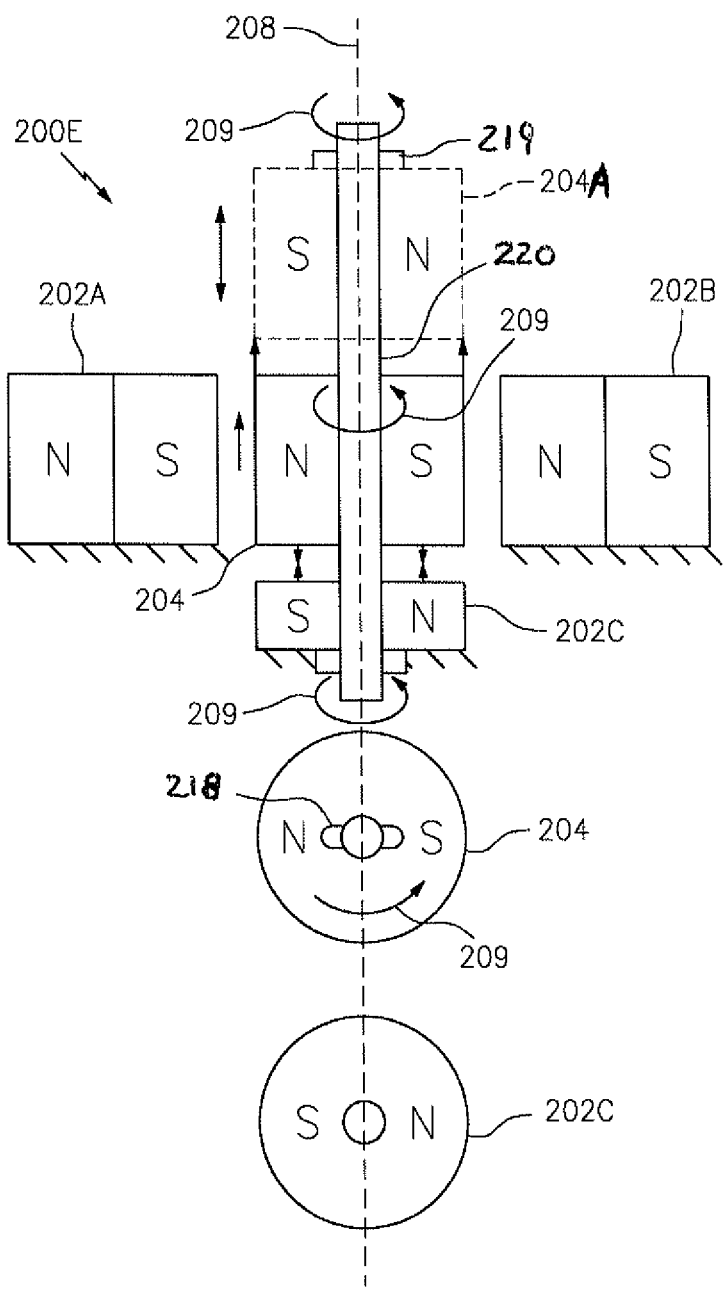
FIG. 2L is a side view of a magnetically-coupled device in accordance with embodiments of the present disclosure.

Referring to FIG. 2L, a magnetically-coupled device 200E is shown from a side view according to embodiments of the present disclosure. The magnetically-coupled device 200E is similar to the magnetically-coupled device 200B of FIG. 2E and the magnetically-coupled device 200C of FIG. 2G. The magnetically-coupled device 200E includes three stationary magnets; a first stationary magnet 202A, a second stationary magnet 202B, and a third stationary magnet 202C. The magnetically-coupled device 200E further includes a movable magnet 204 configured to rotate about a magnet axis (or rotor axis) 208 in a rotational direction 209 with a shaft 220. The movable magnet 204 defines a shaft receiving geometry 218 which is configured to receive a corresponding shaft protrusion geometry 219 therein. The shaft receiving geometry 218 and shaft protrusion geometry 219 ensure that the movable magnet 204 rotates with the shaft 220.

The first stationary magnet 202A and second stationary magnet 202B are configured on opposite sides of the movable magnet 204 in a radial direction from the shaft 220. The third stationary magnet 202C or basal magnet is arranged on a side (or end-face of the cylinder) of the movable magnet 204 in an axial direction of the shaft 220. The shaft 220 extends through and rotates within the third stationary magnet 202C, but the third stationary magnet does not rotate with the shaft 220. The magnetically-coupled device 200E is shown in an equilibrium state position (ESP) as shown in FIG. 2L.

The operation of the magnetically-coupled device 200E in FIG. 2L is similar to the operation of the magnetically-coupled device 200B of FIG. 2E and the magnetically-coupled device 200C of FIG. 2G. When the movable magnet 204 rotates in the rotational direction 209, the tension of the attractive magnetic forces and compression of the opposing magnetic forces (as discussed herein in connection with other embodiments) act on the movable magnet 204 such that the device 200E is in a stressed state position (SSP) and will seek to return the movable magnet 204 to the equilibrium state position (ESP). If the movable magnet 204 is rotated enough about the magnet axis 208 the device will be in the decoupled state position (DSP), and the opposing magnetic forces caused by the same polarity (N-N; S-S) acting on the respective sides of the movable cylindrical magnet 204 will force the movable magnet 204 away from the third stationary magnet 202C in an axial direction of the shaft 220 (as shown by up arrows) to a displaced position (or new position). The broken lines 204A show a possible displaced position of the movable magnet 204. The movable magnet 204 can be displaced until the movable magnet 204 rests against a stop element 219 (as discussed above) or until the sum of the magnetic forces are balanced with the force due to gravity if the magnetically-coupled device 200E is arranged vertically.

Figure 3A:
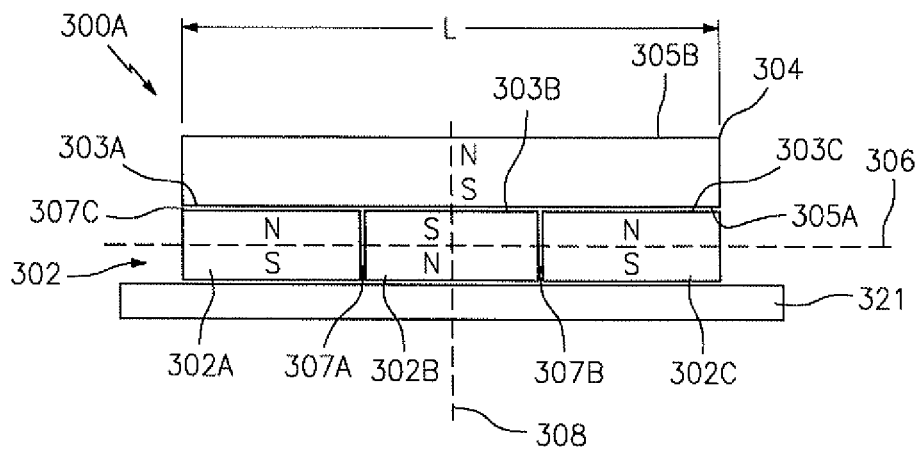
FIG. 3A is a side view of a magnetically-coupled device in accordance with embodiments of the present disclosure.
Figure 3B:
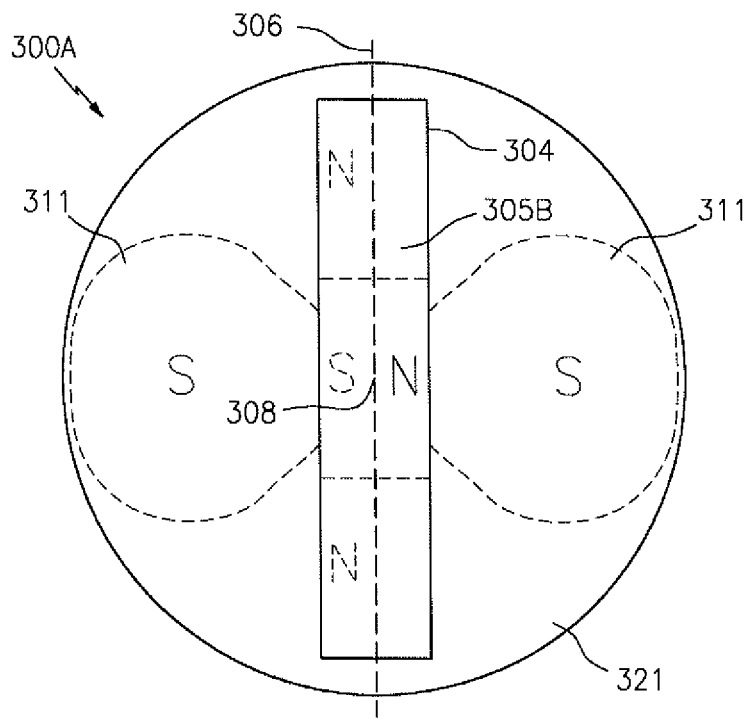
FIG. 3B is a top view of the magnetically-coupled device of FIG. 3A in accordance with embodiments of the present disclosure.
Figure 3C:
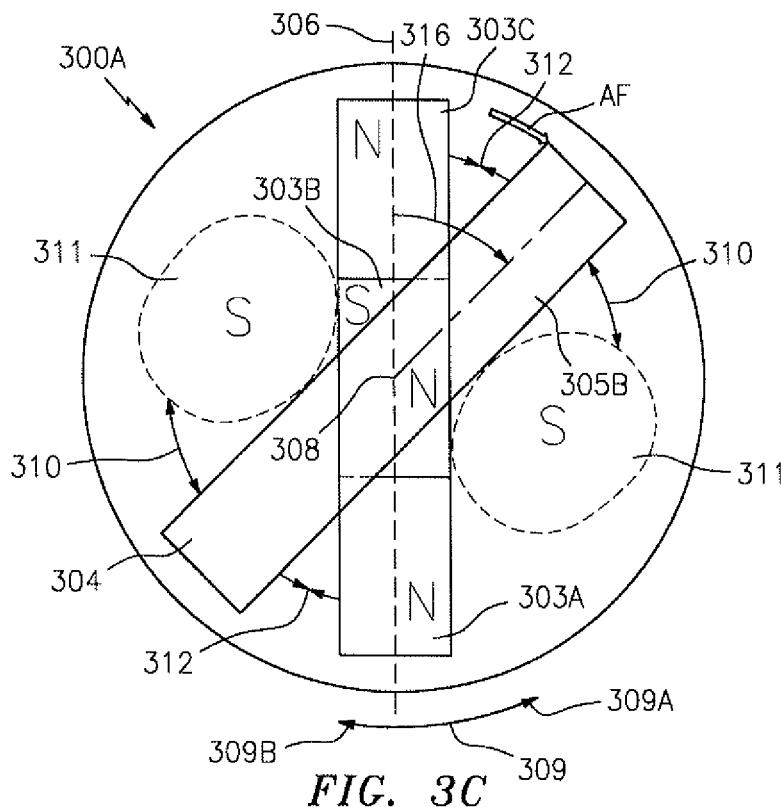
FIG. 3C is a top view of the magnetically-coupled device of FIG. 3A in operation in accordance with embodiments of the present disclosure.
Figure 3D:
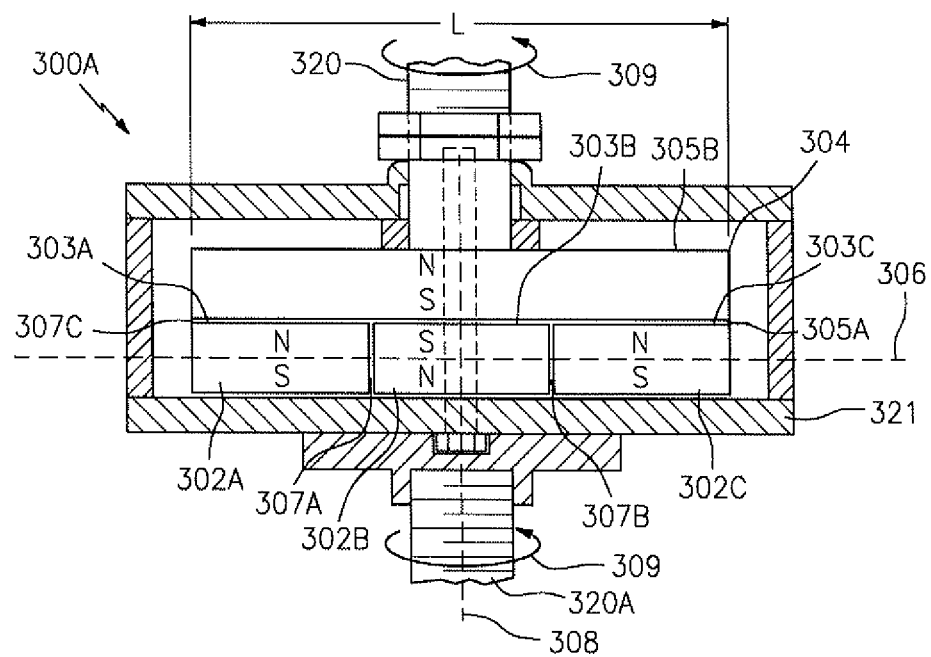
FIG. 3D is a side view of the magnetically-coupled device of FIG. 3A connected to a shaft in accordance with embodiments of the present disclosure.

Referring to FIGS. 3A and 3B, a magnetically-coupled device 300A using a rotational rectangular magnet, according to embodiments of the present disclosure, is shown from a side view in FIG. 3A and FIG. 3D, and from a top view in FIG. 3B. The device 300A includes a plurality of rectangular stationary magnets 302A, 302B, 302C (collectively identified as 302) and a rectangular movable magnet 304 having a length L substantially the same length as the three stationary magnets 302A, 302B, 302C. The stationary magnets 302 and movable magnet 304 are permanent magnets (described more hereinafter). The stationary magnets 302 are fixed in or on a surface or material 321 along a stationary magnet line or path 306 from a side view and along a line 306 (FIG. 3B) from a top view. The movable magnet 304 is rotatable about a moving magnet axis (or rotor axis) 308. The stationary magnets 302 alternate in magnetic polarity (e.g. N, S, N upper half; S, N, S lower half) along the stationary magnet path 306.

The first stationary magnet 302A (left magnet in FIG. 3A) has north pole N polarity on a surface side 303A facing the movable magnet 304, the second stationary magnet 302B (middle magnet in FIG. 3A) has south pole S polarity on the side 303B facing the movable magnet 304 and the third stationary magnet 302C (right magnet in FIG. 3A) has south pole S polarity on the side 303C facing the movable magnet 304 (similar to the magnet 302A). The movable magnet 304 has opposite polarity on different sides of the magnet 304. The bottom side 305A of the movable magnet 304 facing the stationary magnets 302 has south pole S polarity along its length L and the top side 305B facing away from the stationary magnets 302 has north pole N polarity along its length L.

There are relatively small gaps 307A, 307B (e.g., approximately 1 mm or touching each other) between adjacent stationary magnets 302 along the stationary magnet path 306. The distances of the gaps 307A, 307B are substantially equal between the adjacent stationary magnets 302, however, the distances of the gaps 307A, 307B may be unequal in order to configure the system in a particular manner as is later discussed herein in greater detail. There is also a relatively small rotor-stator gap 307C (e.g., 2 mm Teflon coating on bottom surface 303A of rotor magnet 304) between the movable magnet 304 and the top surface level of the stationary magnets 302. Other gap sizes, magnetic geometries, and configurations may be used if desired.

Also, the three rectangular flat magnets for the stationary or stator magnets 302A, 302B, 302C (collectively referred to as the stator magnets 302) in the embodiments of FIGS. 3A-3J may be Neodymium grade N42 permanent magnets, having a length of about 1", width of about ½ inches and thickness of about ¼ inches, made by K&J Magnetics. The rectangular flat magnet for the movable or rotor magnet 304 in this embodiment may be Neodymium grade N42 permanent magnets, having a length L of about 3", width of about ½ inches and thickness of ¼ inches, made by K&J Magnetics, part number B2084. Other dimensions and shapes of the magnets may be used if desired depending on the design requirements. Also, the magnets may be glued (or epoxied) to or embedded into or clamped to the housing or plates or may have holes located transversely through the thickness of the magnets to receive bolts or screws or the like to secure the magnets to the housing or plates if desired. Also, having transverse holes through the rectangular magnets may also be used to provide increased magnetic field strength of the magnets, which may enhance performance in some applications.

Referring to FIG. 3B, since there is a relatively small gap 307C between the movable magnet 304 and the top surface 303A, 303B, 303C of the stationary magnets 302, the south pole S polarity of the bottom side 305A of the movable magnet 304 and the matching (repulsive) south pole S polarity of the middle stationary magnet 302B generate magnetic field blooms 311 of similar polarity S (FIG. 3B) at least in a horizontal (or lateral) direction from the magnets 302, 304 due to the known Halbach effect.

Referring to FIG. 3C, when an angular external applied force AF acts on the upper rectangular movable magnet 304, there are at least two repulsive magnetic forces 310 generated due to the matching polarity of the south pole polarity magnetic field blooms 311 and the bottom side 305A of the movable magnet 304 (south-south), one at each end of the movable magnet 304 which are in compression pushing against the applied force AF for each magnetic field bloom 311 for a total of at least two repulsive forces 310. Also, there are two attractive magnetic forces 312 due to the opposite polarities of the first stationary magnet 302A and the bottom side 305A of the movable magnet 104 (north-south) and the opposite polarities of the third stationary magnet 302C and the bottom side 305A of the movable magnet 304 (north-south) which are in tension or stretched during rotation and also act against the applied force AF. The position of the movable magnet 304 shown in FIGS. 3A and 3B may be considered an equilibrium state or equilibrium state position (ESP). In the equilibrium state, the sum of the forces acting on the movable magnet 304 are zero such that the movable magnet 304 remains stationary.

Referring to FIG. 3C, in operation, an applied force AF is applied to a side of the movable magnet 304 in a counter-clockwise rotational direction 309B. The applied force AF causes the movable magnet 304 to move an angular stress distance 316 from the equilibrium state position. The configuration of the magnetically-coupled device 300A opposes the applied force AF. The repulsive forces 310 between the movable magnet 304 and the magnetic field blooms 311 that the ends of the movable magnet 304 are rotated towards due to the rotation, increases as the movable magnet 304 moves towards the magnetic field blooms 311. When the movable magnet 304 is in the stressed state position, at least one of the magnetic field blooms 311 is compressed (or in a compressed state) compared to when the movable magnet 304 is in the equilibrium state position. The attractive forces 312 between the first stationary magnet 302A and the movable magnet 304, and the third stationary magnet 302C and the movable magnet 304 decrease due to the magnetic fields being "stretched" (or in tension) from being moved away from each other. The magnetically-coupled device 300A in FIG. 3C may be considered to be in a stressed state or stressed state position.

When the applied force AF is removed (or decreased in strength), the device 300A will seek to (or be biased to or attempt to) return the movable magnet 304 to the equilibrium state position (ESP), i.e., the position shown in FIGS. 3A and 3B. The device 300A will seek to achieve the equilibrium state position because the sum of the angular magnetic forces on the movable magnet 304 is not equal. In particular, with the AF removed, the angular repulsive forces 310 together with the angular attractive forces 312, force the movable magnet 304 towards the equilibrium state position (ESP). Advantageously, the movable magnet 304 may rotate any number of times in either direction of the rotational direction 309. In other words, the movable magnet 304 may move 360° or more in a first rotational direction 309A (counterclockwise) and/or 360° or more in a second rotational direction 309B (clockwise).

Referring to FIG. 3D, the magnetically-coupled device 300A of FIG. 3A is shown from a side view in FIG. 3D. The magnetically-coupled device 300A may have a housing which contains the magnets described hereinabove and includes the bottom plate 321, and is connected to an input shaft 320 (which receives input rotational force or torque) and an output shaft 320A (which provides output torque). The housing and support structure for the input shaft 320 and output shaft 320A including the bearings or bushings for the input shaft 320, and bottom plate and mounting flange for the output shaft 320A, may be the same as that described with FIG. 2A. However, in this case, there may be a spacer between the top of the rotor and inner ceiling of the housing or casing (rotor top-gap) and there may be locking bolts on the input shaft to set the rotor-stator gap. Other configurations and housings may be used if desired provided it provides the desired function and performance.

Figure 3E:
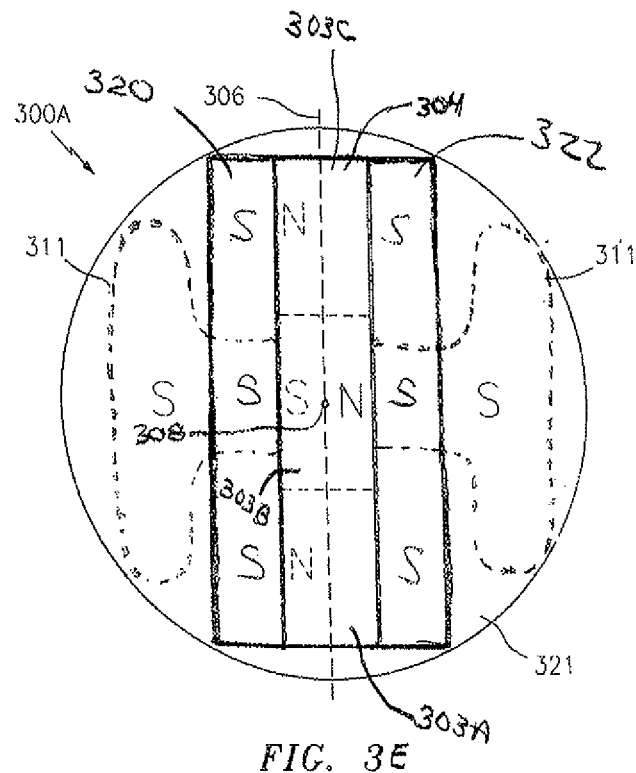
FIG. 3E is a top view of a magnetically-coupled device in accordance with embodiments of the present disclosure.
Figure 3F:
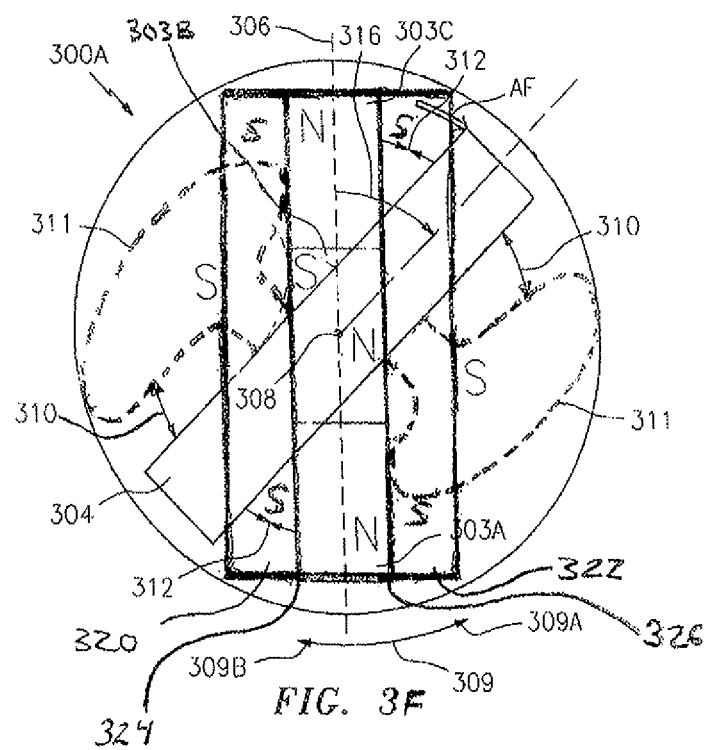
FIG. 3F is a top view of the magnetically-coupled device of FIG. 3E in accordance with embodiments of the present disclosure.

Referring to FIGS. 3E and 3F, the embodiment shown in FIGS. 3B-3D may have additional stationary rectangular permanent magnets 320,322 disposed adjacent to the three stationary (or stator) permanent magnets 302A, 302B, 302C, and may be referred to herein as the "H-drive" design, as described below. The additional stationary rectangular permanent magnets 320,322 are polarized with the South (S) side of the magnet facing upward toward the movable magnet 304, which is polarized with the South (S) side of the magnet 304 facing downward toward the three stationary (or stator) permanent magnets 302A, 302B, 302C, as described hereinbefore. In that case, the magnetic field bloom 311 (from the Halbach effect discussed hereinbefore), takes on the shape of the letter "H", as shown in FIG. 3E, when the movable magnet 304 is in the vertical position, which is the equilibrium state position (ESP) for this embodiment. The H-shape of the field bloom 311 is caused by the added side magnets 320, 322, which also increases the strength of the magnetic field acting on the movable magnet 304. The magnets 320,322 may be the same length and type as the combination of the three stationary permanent magnets 302A, 302B, 302C (collectively, the magnets 302) or be the same length and type as the movable magnet 304. Also, the added magnets 320,322 may have the same thickness as the three stationary permanent magnets 302A, 302B, 302C to help facilitate rotation of the movable magnet 304 when the movable magnet 304 is located very close to or touching the stationary permanent magnets 302A, 302B, 302C, 320, 322. The magnetic field strength the added magnets 320,322 may be the same as the movable magnet 304 or different therefrom if desired. For example, the rectangular flat magnet for the added stator magnets 320,322 may be Neodymium grade N42 permanent magnets, having a length L of about 3", width of about ½ inches and thickness of ¼ inches, made by K&J Magnetics, part number B2084, and may be attached to a housing or plate in a similar way as the other stationary magnets 302, as discussed herein. Also, having transverse holes through the rectangular added side magnets 320,322 may also be used to provide increased magnetic field strength of the magnets, which may enhance performance in some applications.

Referring to FIG. 3F, when the rotational applied force AF is applied to the side of the movable magnet 304 in a rotation direction 309B (clockwise), the applied force AF causes the movable magnet 304 to move an angular distance 316 from the equilibrium state position and the device 303A may be considered to be in a stressed state or stressed state position (SSP). As the movable magnet 304 moves clockwise, the repulsive forces 310 between the movable magnet 304 and the magnetic field blooms 311 that the ends of the movable magnet 304 increase as the movable magnet 304 moves towards and push against the magnetic field blooms 311. When the movable magnet 304 is in the stressed state position, at least one of the magnetic field blooms 311 is compressed (or in a compressed state) compared to when the movable magnet 304 is in the equilibrium state position (FIG. 3E), and the H-shaped blooms becomes distorted or altered. The attractive forces 312 between the first stationary magnet 302A and the movable magnet 304, and the third stationary magnet 302C and the movable magnet 304 decrease due to the magnetic fields being "stretched" (or in tension) from being moved away from each other, similar to that described in the embodiments of FIGS. 3B and 3C; however, the strength of the field blooms 311 are stronger in this embodiment due to the added side magnets 320,322. Also, the embodiments of FIGS. 3E and 3F may have the same side view as FIG. 3A and same housing as FIG. 3D.

Figure 3G:
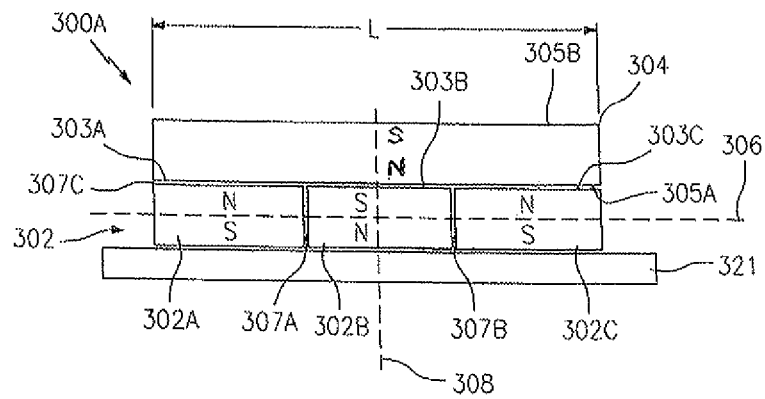
FIG. 3G is a side cross-section view of a magnetically-coupled device in accordance with embodiments of the present disclosure.
Figure 3H:
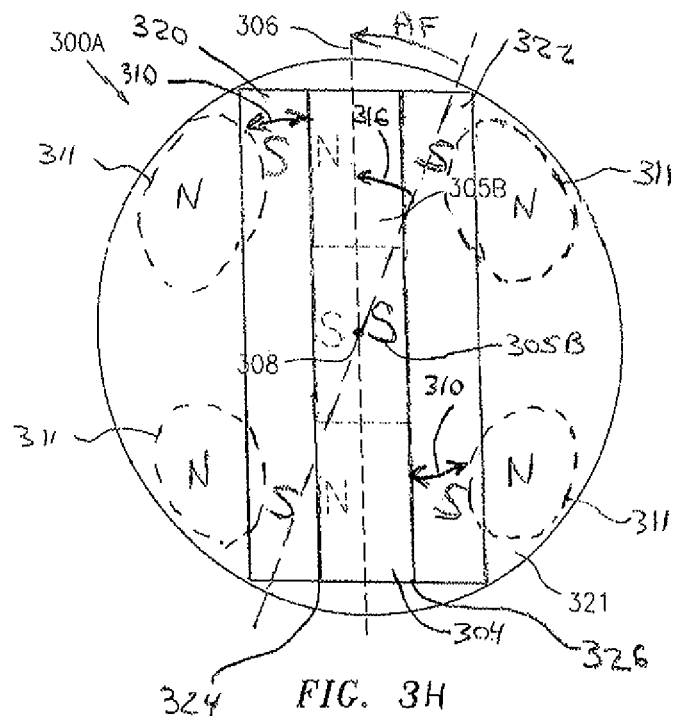
FIG. 3H is a top view of the magnetically-coupled device of FIG. 3G in operation in accordance with embodiments of the present disclosure.
Figure 3I:
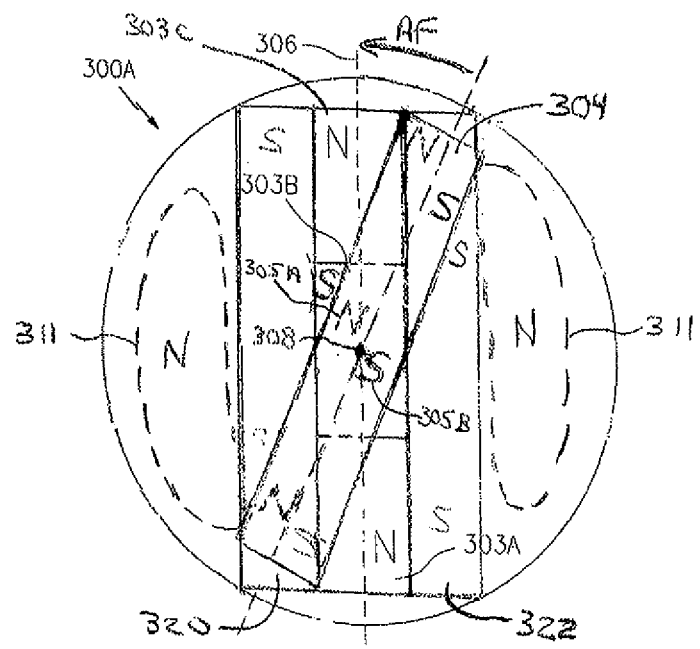
FIG. 3I is a top view of the magnetically-coupled device of FIG. 3G in accordance with embodiments of the present disclosure.
Figure 3J:
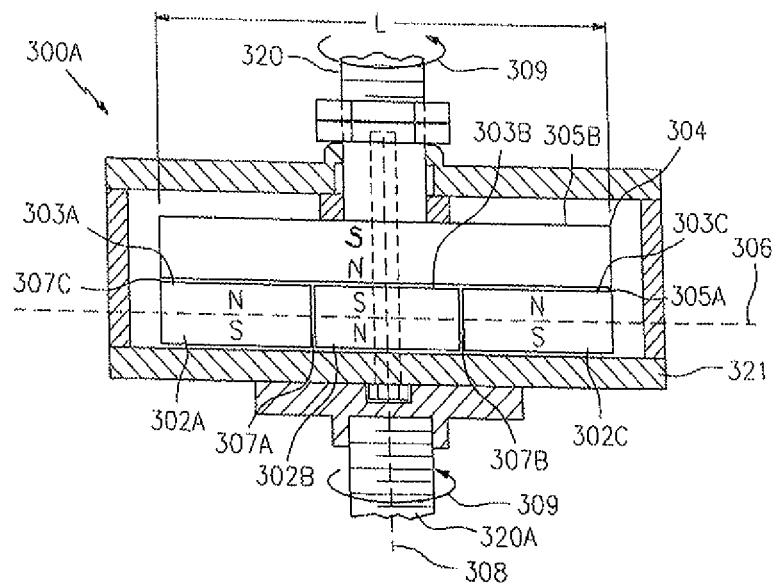
FIG. 3J is a side view of the magnetically-coupled device of FIG. 3G in accordance with embodiments of the present disclosure.

Referring to FIGS. 3G, 3H, 3I, 3J, an alternative to the embodiment of the magnetically-assisted torque assist device of FIGS. 3E and 3F is shown, and may be referred to herein as the "N-drive" design, as described below. In that case, the additional stationary rectangular permanent magnets 320,322 are polarized with the south (S) side of the magnet facing upward toward the movable magnet 304, which is polarized with the North (N) side of the magnet 304 facing downward toward the three stationary (or stator) permanent magnets 302A, 302B, 302C, as shown in FIGS. 3G and 3J.

In particular, referring to FIG. 3I, when the movable magnet 304 is in a right-tilted position, such that the top end of the movable magnet 304 is over the added magnet 322, this is one of the equilibrium state positions (ESP) for this embodiment. In particular, because the bottom face 305A of the movable magnet 304 is polarized as N, it will be repelled by the top and bottom stator permanent magnets 302A, 302C, which are also polarized as N, also the added magnets 320,322 are polarized as S facing toward the movable magnet 304, which causes a strong attraction to the bottom face 305A of the movable magnet 304 is polarized as N. This combination of repulsive and attraction forces is greater than the attraction between the movable magnet 304 and the center stator magnet 202B. Thus, the equilibrium state position of the movable magnet 304 will be either of the right-tilted position (FIG. 3I) or the left-tilted position (not shown).

In the right-tilted position (FIG. 3I), the magnetic field bloom 311 (from the Halbach effect discussed hereinbefore), takes on the shape of an inverted letter "N", when including the movable magnet 304 as part of the bloom field, as shown in FIG. 3I. Similarly, when the movable magnet 304 is in a left-tilted position (not shown), such that the top end of the movable magnet 304 is over the added magnet 320, this is another equilibrium state position (ESP) for this embodiment, and the magnetic field bloom 311 (from the Halbach effect discussed hereinbefore), takes on the shape of a normal letter "N", when including the movable magnet 304 as part of the bloom field 311, as shown in FIG. 3I.

The inverted or normal N-shaped field bloom 311 when in the equilibrium state position is caused by the added side magnets 320, 322, which also increases the strength of the magnetic field acting on the movable magnet 304. The magnets 320,322 may be the same length as the combination of the three stationary permanent magnets 302A, 302B, 302C or be the same length as the movable magnet 304. Also, the magnets 320,322 may have the same thickness as the three stationary permanent magnets 302A, 302B, 302C to help facilitate rotation when the movable magnet is located very close to or touching the stationary permanent magnets 302A, 302B, 302C, 320, 322. The magnetic field strength may be the same as the movable magnet 304 or different therefrom if desired.

Referring to FIG. 3H, when the rotational applied force AF is applied to the side of the movable magnet 304 in a counter-clockwise rotation direction, the applied force AF causes the movable magnet 304 to move an angular distance 316 from the equilibrium state position (FIG. 3I), the device 303A may be considered to be in a stressed state or stressed state position (SSP). As the movable magnet 304 moves counter-clockwise, the repulsive forces 310 between the ends of the movable magnet 304 and the magnetic field blooms 311 that the ends of the movable magnet 304 increase as the movable magnet 304 moves towards and push against the magnetic field blooms 311. When the movable magnet 304 is in the stressed state position, at least one of the magnetic field blooms 311 is compressed (or in a compressed state) compared to when the movable magnet 304 is in the equilibrium state position (FIG. 3E), and the blooms 311 become distorted or altered. The attractive forces 312 between one (proximal) end of the movable magnet 304 and the added (left) side magnet 320, and between the opposite (distal) end of the movable magnet 304 and the other added (right) side magnet 322 decrease due to the magnetic fields being "stretched" (or in tension) from being moved away from each other. Also, the embodiments of FIGS. 3G and 3J show the side view and housing for this embodiment, which are similar to that in may have the same side view as FIG. 3A and same housing as FIG. 3D.

As with other embodiments described herein, the gap between the rotor and stator permanent magnets influences the magnetic field strength, with a larger gap corresponding to a weaker magnetic attraction or repulsion. In the case of the Halbach designs described herein (FIGS. 3A-3J), the field bloom 311 will decrease (or as large in size or density) as the rotor-stator gap 307C is increased, as one aspect of the Halbach effect is to force two magnetic faces of like-polarity together (e.g., N-N or S-S) to effectively squeeze the flux field out the sides into adjacent areas, thereby creating the magnetic field or flux "bloom" discussed herein.

Also, the added stator magnets 320, 322, may touch the other stator magnets 302A, 302B, 302C, or there may be gaps 324,326 between them, e.g., about 1 mm and the left side gap 324 and right side gap 326 distances may be equal or unequal depending on the desired system performance. Other gap distances may be used if desired depending on the desired system performance. Also, instead of having three separate stationary (or stator) magnets 302A, 302B, 302C, a single magnet may be used having three regions which have the desired magnetic polarization along its length that performs the same function as the three separate magnets. Also, the stator magnets 302A, 302B, 302C, may be comprise a plurality of smaller magnets that are stacked together to perform the same function as the stator magnets 302A, 302B, 302C described herein.

Figure 4B:
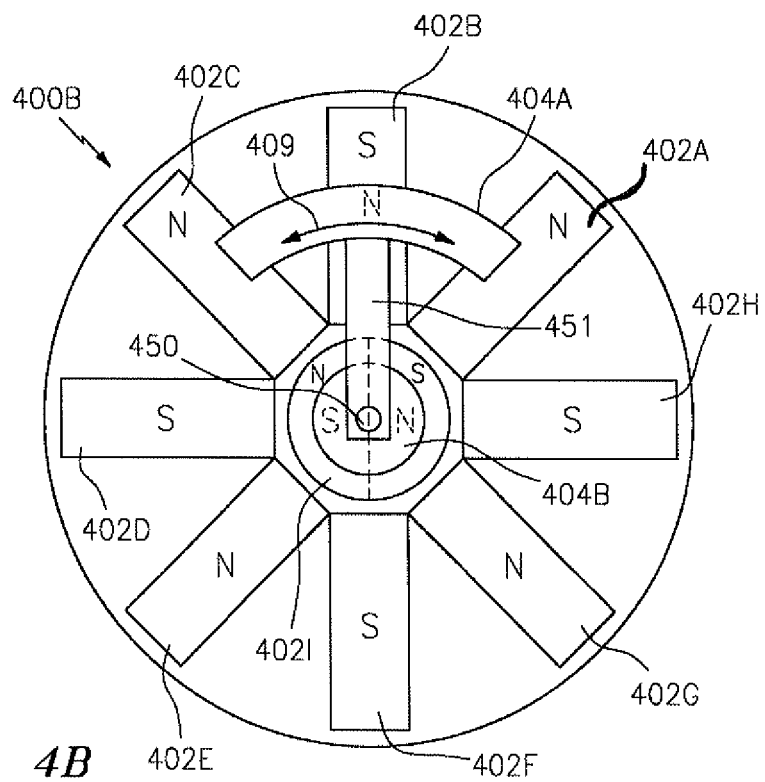
FIG. 4B is a top view of a magnetically-coupled device in accordance with embodiments of the present disclosure.
Figure 4A:
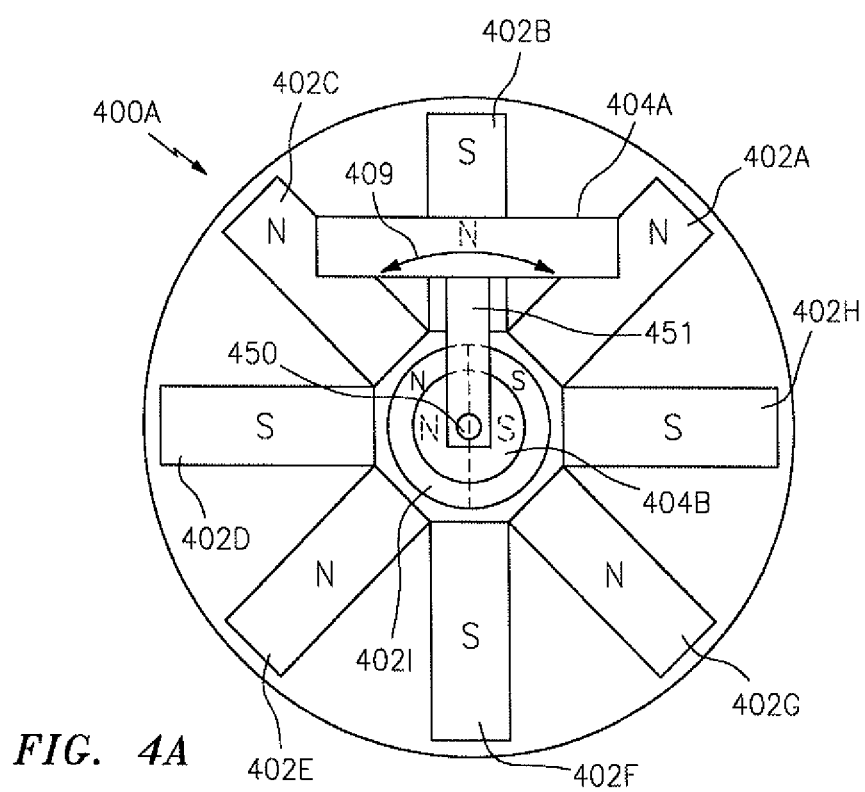
FIG. 4A is top view of a magnetically-coupled device in accordance with embodiments of the present disclosure.

Referring to FIG. 4A, a magnetically-coupled device 400A is shown from a top view. The magnetically-coupled device 400A includes a plurality of stationary magnets 402 (402A-402I), a first movable magnet 404A and a second (or center) movable magnet 404B. The first movable (rotor) magnet 404A (or wiper or swing magnet) is connected to a rotatable shaft 450 through an arm 451. The stationary magnets 402 may be rectangular straight bar magnets polarized on their faces along their length (largest surface area) that are arranged in a "daisy" configuration except for the stationary magnet 402I arranged beneath the second movable magnet 404B in an axial direction of the shaft 450. As such, the distance between stationary magnets 402 in a circumferential direction increases as the radial distance from the shaft 450 axis of rotation increases.

The first movable magnet 404A and the second movable magnet 404B are configured to rotate in the rotation direction 409 (clockwise or counterclockwise) with the shaft 450 about the shaft axis of rotation (or magnet axis rotation discussed above). The first movable magnet 404A may be adjustable along the arm 451 in a radial direction from the shaft 450 through known mechanical adjust mechanisms, e.g., nut adjustment, sliding shifter, adding or removing washers, or spacers, or the like. The adjustment of the first movable magnet 404A allows another degree of freedom in the magnetically-coupled device design. For instance, the amount of force required to magnetically break or decouple the first movable magnet 404A to another equilibrium state position (ESP) can be adjusted through adjustment of the first movable magnet 404A position along the arm 451.

Similar to the operation of the magnetically-coupled device 200C of FIG. 2G and the magnetically-coupled device 200E of FIG. 2L, the second movable (or rotatable) magnet 404B and, thus, the arm 451 and first movable magnet 404A, can be forced to a displaced position (or new position) in the axial direction of the shaft when the second movable magnet 404B is rotated enough such that the opposing magnetic forces from the stationary magnet 402I beneath the second movable magnet 404B is strong enough to force the movable elements away (or "pop-up" from the stator magnet). As in the other embodiments discussed herein, the movable magnets 404A, 404B and the arm 451 can return to the position shown in FIG. 4A when rotated enough to return the elements to their original position in the axial direction.

Referring to FIG. 4B, a magnetically-coupled device 400B is shown from a top view. The magnetically-coupled device 400B is substantially the same as the magnetically-coupled device 400A of FIG. 4A, except that the first movable magnet 404A is curved in the direction of rotation 409. The shape and size of the first movable magnet 404A allows for another degree of freedom in the magnetically-coupled device design.

Figure 4C:
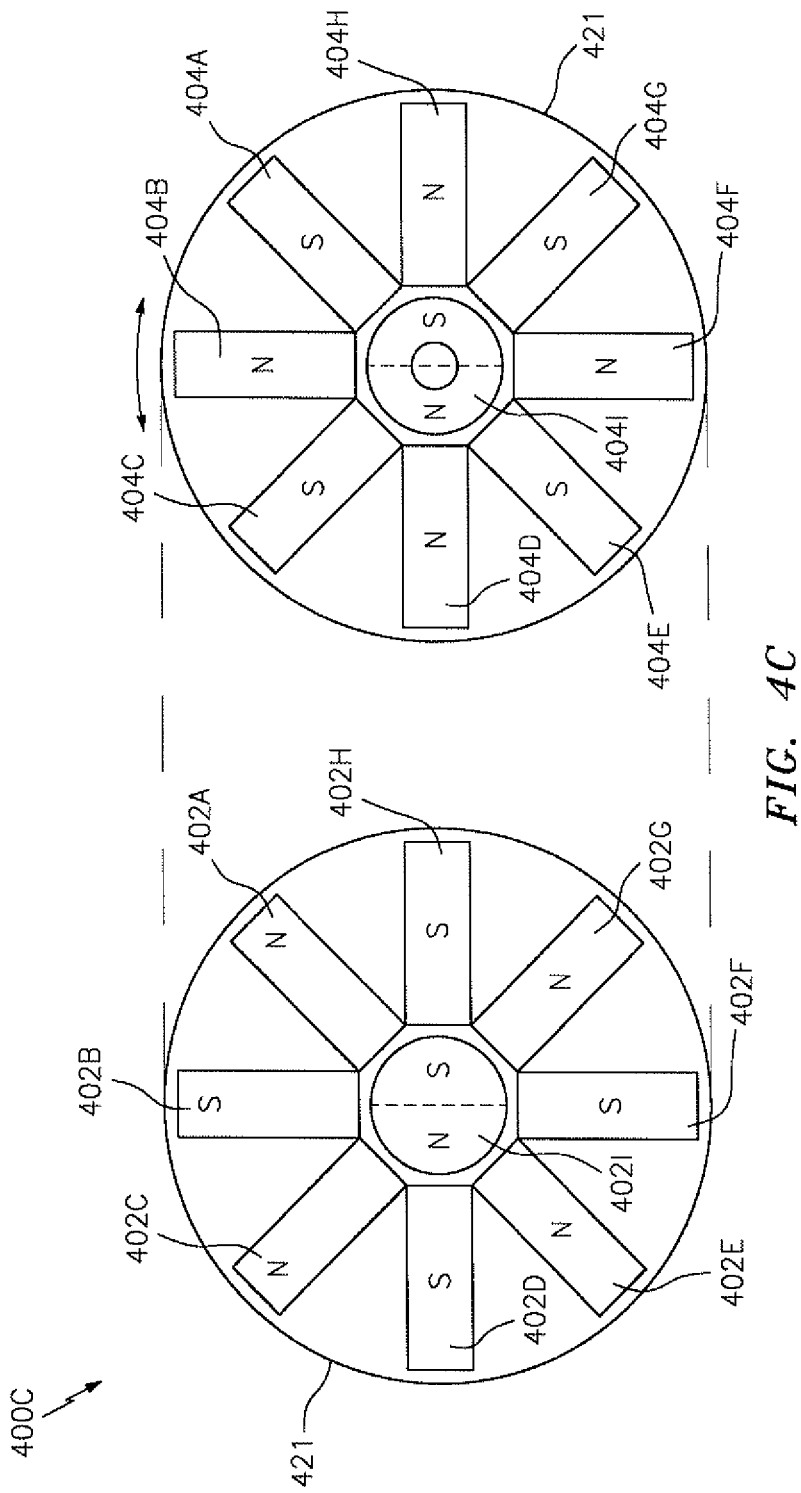
FIG. 4C is a top exploded open clam-shell view of a magnetically-coupled device in accordance with embodiments of the present disclosure.

Referring to FIG. 4C, a top view of a magnetically-coupled device 400C is shown. The magnetically-coupled device 400C includes a stator component 401A and a rotor component 401B. The stator component 401A includes a stator ring 421 containing a plurality of stationary magnets 402. The stationary magnets 402 are arranged in a daisy pattern as in the embodiments shown in FIGS. 4A and 4B, with an optional central cylindrical stationary magnet 402I. The rotor component 401B includes a rotor ring 422 containing a plurality of movable magnets 404 arranged in a daisy pattern with an optional central cylindrical movable magnet 404I.

The operation of the magnetically-coupled device 400C is similar to other magnetically-coupled device embodiments described herein. When the rotor component 401B is arranged to rotate over the stator component 401A, the plurality of magnetic forces will seek to keep the rotor component 401B in one of the equilibrium state positions (ESP). When the rotor component 401B is rotated enough, the opposing magnetic forces, including the opposing magnetic forces from the central stationary magnet 402I and the central movable magnet 404I will force the rotor component 401B to a displaced position (or new position). After further rotation of the rotor component 401B, the rotor component 401B can return to its original axial position relative to the stator component 401A.

Figure 4D:
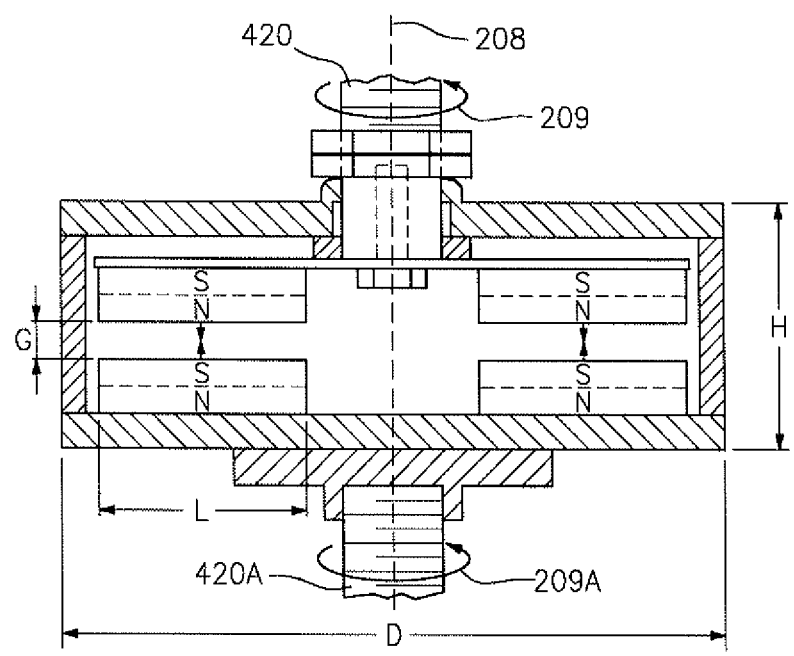
FIG. 4D is a side cut-away view of a portion of the magnetically-coupled device of FIG. 4C, in accordance with embodiments of the present disclosure.

FIG. 4D is a side cut-away view of a portion of the magnetically-coupled device of FIG. 4C without the optional cylindrical magnets, in accordance with embodiments of the present disclosure. The magnetically-coupled device of FIG. 4D may have a housing which contains the magnets described hereinabove, and is connected to an input shaft 420 (which receives input rotational force or torque) and an output shaft 420A (which provides output torque). The housing and support structure for the input shaft 420 and output shaft 420A including the bearings or bushings for the input shaft 420, and bottom plate and mounting flange for the output shaft 420A, may be the same as that described with FIG. 3D. However, in this case, there may be a spacer between the top of the rotor and inner ceiling of the housing or casing (rotor top-gap) and there may be locking bolts or the like on the input shaft to set or adjust the rotor-stator gap. Other configurations and housings may be used if desired provided it provides the desired function and performance.

More specifically, the casing or housing may have an outer diameter D of about 5 inches and an inner diameter of about 4 inches, and, thus, a housing wall thickness of about ½ inch. The housing height H may be about 1.5 inches tall and the gap G between the rotor and stator magnets may be about 5 mm to about ⅛ inches. Also, the rotor top-gap between the top of the rotor plate to which the rotor magnets are attached and the inner ceiling of the housing, may be about ¼ inches (but other top-gaps may be used if desired). Also, other rotor-stator gaps G may be used if desired depending on the desired performance requirements, as discussed herein. The other components of the magnetically-coupled device such as the input shaft, bearing, output shaft, and connecting flanges may be the same as that described hereinbefore with FIG. 2A or FIG. 3D. The housing and the rotor plate may be made of a ferrous material such as steel or other magnetic conducting material, which enhances the flux strength, as described hereinbefore with FIG. 2A. The rotor plate may have a diameter of about 3.5 inches. Other dimensions may be used if desired. This structure may be used with any geometry magnets, e.g., rectangular, square, circular, cylindrical, or any other shape, such as those geometries described herein or any other geometries/shapes.

Also, the rectangular flat magnets in FIGS. 4A-4D may be Neodymium grade N42 permanent magnets, having a length L of about 1", width of about ½ inches and thickness of about ¼ inches, made by K&J Magnetics. Also, the magnets may be glued (or epoxied) to or embedded into or clamped to the housing or plates or may have holes located transversely through the thickness of the magnets to receive bolts or screws or the like to secure the magnets to the housing or plates if desired. Other dimensions and shapes for the magnets may be used if desired depending on the design requirements. Also, having transverse holes through the rectangular magnets may also be used to provide increased magnetic field strength of the magnets, which may enhance performance in some applications.

Figure 5A:
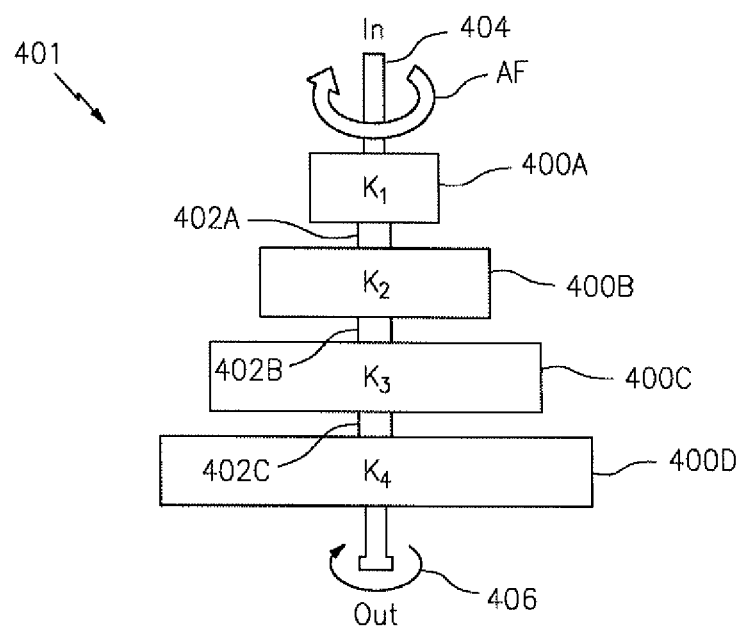
FIG. 5A is a diagram of a plurality of magnetically-coupled devices in accordance with embodiments of the present disclosure.

Referring to FIG. 5A, a diagram 401 shows a system of a plurality of magnetically-coupled devices 400A, 400B, 400C, 400D (collectively identified as 400) connected in series, adjacent devices connected by shafts 402A, 402B, 402C, in accordance with embodiments of the present disclosure. The plurality of devices 400 includes a first magnetically-coupled device 400A having an input shaft 404 and a first spring constant $K_1$, a second magnetically-coupled device 400B having a second spring constant $K_2$, a third magnetically-coupled device 400C having a third spring constant $K_3$ and a fourth magnetically-coupled device 400D having a fourth spring constant $K_4$. In this embodiment, the devices 400 are arranged in ascending order of spring constant magnitude, e.g., $K_1<K_2<K_3<K_4$. In some embodiments, the last device 400D may be fixed and not have an output shaft.

Figure 5B:
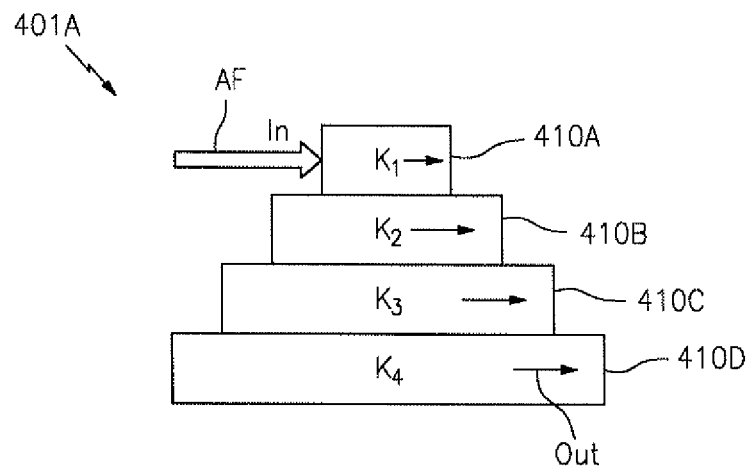
FIG. 5B is a diagram of a plurality of magnetically-coupled devices in accordance with embodiments of the present disclosure.

Referring to FIG. 5B, in some embodiments, instead of rotational center shaft configuration they may operate in a planar arrangement having various different spring constants or stiffnesses as described herein (with FIGS. 1A-1E and 1J), where the applied force is, e.g., from the left side (or right). Any other arrangement of a plurality of the magnetically-coupled devices or toque assist devices may be used if desired.

While the diagrams 401 and 401A show the system having four magnetically-coupled devices, it should be readily understood that in embodiments according to the present disclosure there may be less or more than four magnetically-coupled devices 400. Further, it should be readily understood that the magnetically-coupled devices are not always arranged in ascending or descending order of spring constant K.

Figure 6:
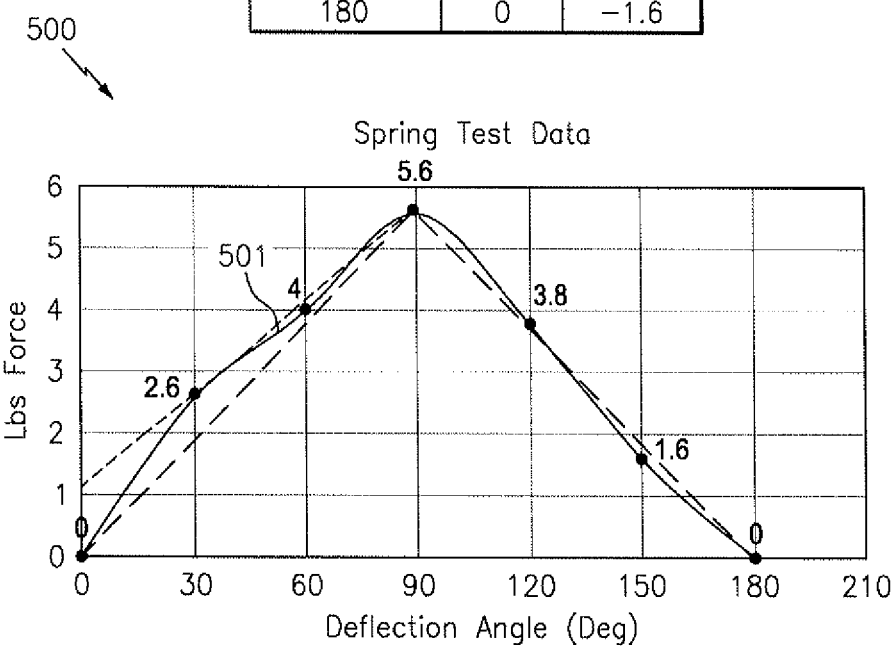
FIG. 6 is a plot of experimental data obtained for a magnetically-coupled device in accordance with embodiments of the present disclosure.

Referring to FIG. 6, a plot (or graph) 500 (and corresponding data table) is shown of experimental data of a magnetically-coupled device similar to the device 200A shown in FIGS. 2A-2C, and two cylindrical permanent magnets described herein. The plot 500 shows a curve 501 representing the monitored applied force AF applied at 2.5 inches from the movable magnet axis 208 on an exemplary magnetically-coupled device. The curve 501 is plotted in Lbs of applied force AF against angle (in degrees) of deflection (or rotation) of the movable magnet. The curve 501 increases substantially linearly through 90° of deflection (or rotation) of the movable magnet 204. After 90° of deflection, the applied force necessary for rotating the movable magnet 204 decreases substantially linearly until it reaches 180°. There are two dashed lines shown for the increasing curve (0-90 degrees), the upper dashed line shows a straight line through the points from 30-90 deg., which appears to be very close to a linear response. The lower dashed line shows a straight line through all the points from 0-90 deg., which is also close to a linear response. There is a single dashed line shown for the decreasing curve (90-180 deg.), this dashed line is a straight line through the points from 90-180 deg., which appears to be very close to a linear response. Various linear approximations or curves fits for the data may be used if desired, however, the dashed lines show a substantially linear response for various regions of operation.

The slope (or slopes) of the curve 501 (or portions thereof) may be considered an approximation for the spring constant K (or stiffness) of the magnetically-coupled device over a particular operating range (or range of angles or forces). As discussed above, the spring constant K and, thus, the slope of the curve 501 (or portions thereof), may be selectively determined by configuring the magnetically-coupled device parameters such as magnet(s) strength, including any housing or mounting plate materials and the rotor-stator magnet gap distances.

It should be understood that any desired elastic force/distance profile may be created with the present disclosure, including partially linear, partially non-linear or any desired force/distance profile based on the magnets, gap, and materials used.

FIGS. 7A-7D (describe in more detail below) show embodiments of magnetically-coupled or toque assist device (s) of the present disclosure having no mechanical connection between the rotor and stator, i.e., no bearings or bushings or housing that mechanically connect (or provide mechanical contact between) the rotor and stator. In that case, there may be a removable spacer or spacers disposed between the rotor and stator, shown as dashed rectangular box or boxes. The removable spacers may be used to keep the rotor and stator physically separated from each other before installation (as they will be attracted to each other due to the rotor-stator opposite magnetic field (N-S; S-N) attraction). Once the input and output shafts are connected, e.g., via appropriate couplings or the like, to their respective other components in the system, e.g., other shafts that are fixed in position, the spacer(s) may be removed and the magnetically-coupled or torque assist device will operate without any mechanically attached parts, thereby providing a device with no mechanical wear or friction, which reduces device maintenance. There may also be an optional housing, shown as a large outer dashed box, which may be used to contain or hold the parts during installation of the device into a larger system (e.g., attachment of the input and output shaft to other system shafts); however, the housing would not physically touch any moving parts of the device. The housing may also be used as a protective or safety cover or shield to protect personnel from rotating machinery or to protect the magnets in the magnetically-coupled device from attracting external metallic or magnetic parts or for other safety or performance reasons.

Figure 7A:
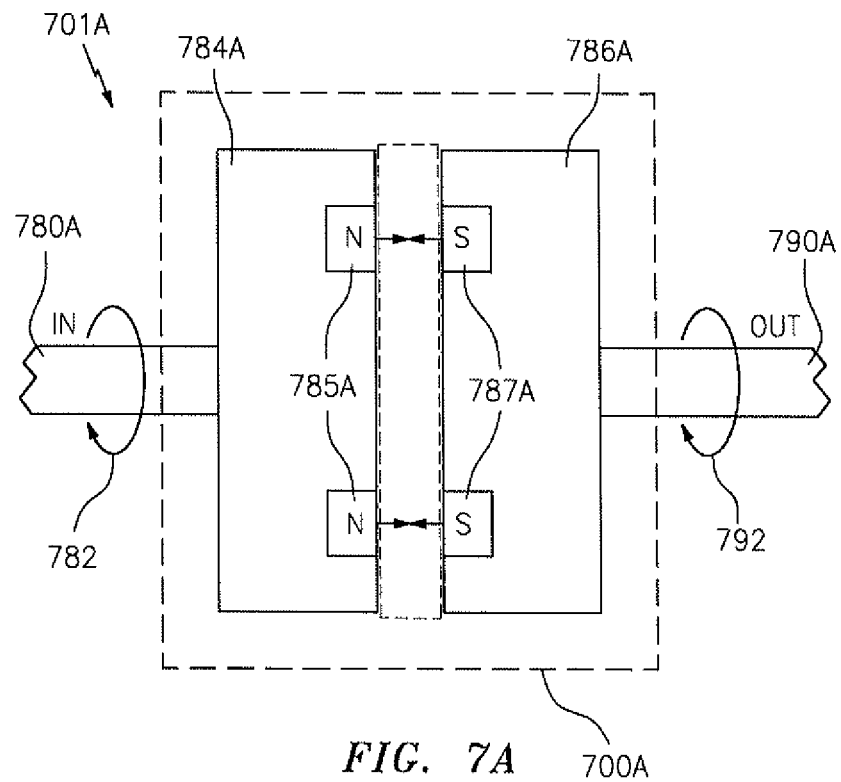
FIG. 7A is a side view of the magnetically-coupled device embodiment with input and output shafts and no mechanical connection between the rotor and stator in accordance with embodiments of the present disclosure.

Referring to FIG. 7A, a magnetically-coupled device shaft configuration 701A is shown in accordance with embodiments of the present disclosure. The shaft configuration 701A comprises a magnetically-coupled device 700A having a first component (or rotor) 784A in the form of a drum connected to an input shaft 780A and a second component 786A (or stator) in the form of a drum connected to an output shaft 790A. The first component 784A contains a first set of magnets 785A contained on an external surface of the drum facing the second component 786A, and the second component 786A contains a second set of magnets 787A contained on an external surface of the drum facing the first component 784A. The shaft configuration 701A is such that the first component 784A and the second component 786A are arranged side-by-side in an axial direction of the input shaft 780A and/or output shaft 790A.

In operation, rotation of the input shaft 780A in the rotation direction 782 causes rotation of the first component 784A of the magnetically-coupled device 700A. The magnetic forces caused by the rotation will cause rotation of the second component 786A in accordance with magnetic forces generated by the magnetically-coupled device embodiments discussed herein thereby driving the output shaft 790A in the rotation direction 792.

Figure 7B:
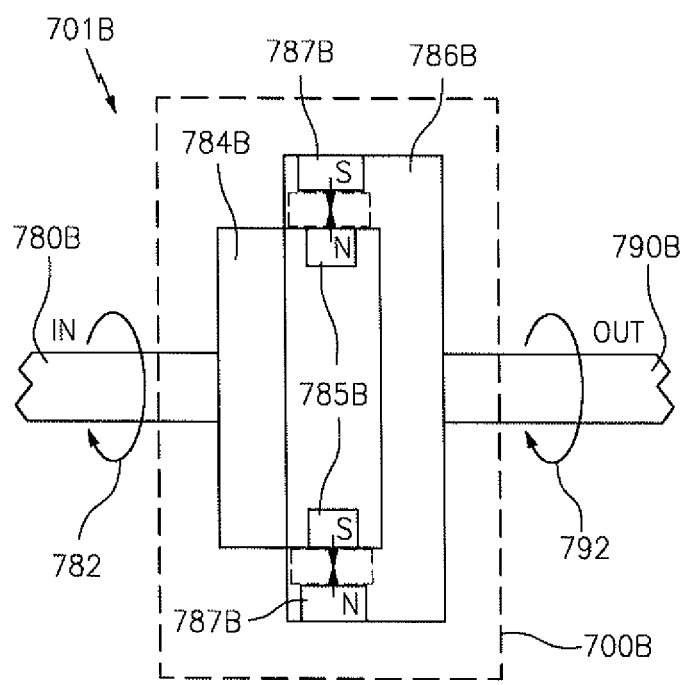
FIG. 7B is a side view of the magnetically-coupled device alternative embodiment with input and output shafts and no mechanical connection between the rotor and stator in accordance with embodiments of the present disclosure.

Referring to FIG. 7B, a magnetically-coupled device shaft configuration 701B is shown in accordance with embodiments of the present disclosure. The magnetically-coupled device shaft configuration 701B is substantially the same as the magnetically-coupled device shaft configuration 701A of FIG. 7A except that the first component 784B is arranged within a recess of the second component drum 786B. The first set of magnets 785B are arranged on a circumferential outer surface of the first component 784B and the second set of magnets 787B are arranged on a circumferential inner surface of the second component 786B. Advantageously, the second component drum 786B having a recess to accommodate the first component 784B provides protection of the device 700B from particular, contaminants, etc.

Figure 7C:
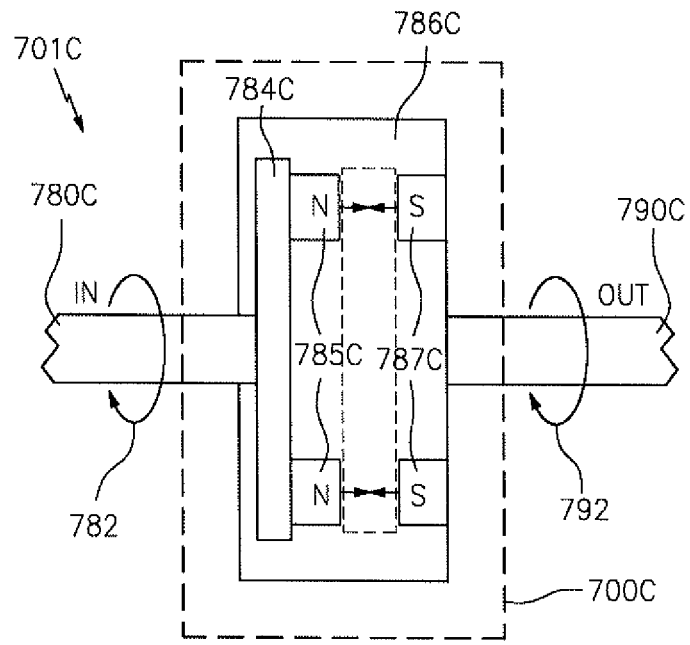
FIG. 7C is a side view of the magnetically-coupled device alternative embodiment with input and output shafts and no mechanical connection between the rotor and stator in accordance with embodiments of the present disclosure.

Referring to FIG. 7C, a magnetically-coupled device shaft configuration 701C is shown in accordance with embodiments of the present disclosure. The magnetically-coupled device shaft configuration 701C is substantially the same as the magnetically-coupled device shaft configuration 701A of FIG. 7A and/or the magnetically-coupled device shaft configuration 701B of FIG. 7B except that the first component 784C is arranged in the form of a plate. The first set of magnets 785C are arranged on a side of the first component plate 784C facing the second component 786C and the second set of magnets 787B are arranged on an internal surface of the second component 786C facing the first component 784C.

Figure 7D:
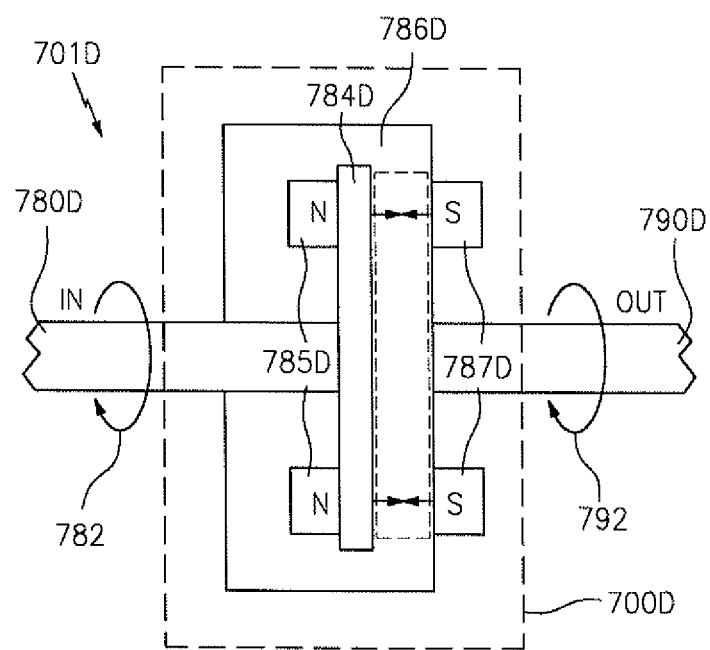
FIG. 7D is a side view of the magnetically-coupled device alternative embodiment with input and output shafts and no mechanical connection between the rotor and stator in accordance with embodiments of the present disclosure.

Referring to FIG. 7D, a magnetically-coupled device shaft configuration 701D is shown in accordance with embodiments of the present disclosure. The magnetically-coupled device shaft configuration 701D is substantially the same as the magnetically-coupled device shaft configuration 701C of FIG. 7C except that the first component 784C is arranged in the form of a plate. The first set of magnets 785C are arranged on a side of the first component plate 784C facing the second component 786C and the second set of magnets 787B are arranged on an internal surface of the second component 786C facing the first component 784C.

In some embodiments, the magnetically-coupled device of the present disclosure, may be used for increasing the torque for any rotating or angularly displacing body by means of an elastic magnetic circuit using an arrangement (described herein) of high-energy permanent magnets, resulting in a magnetically-coupled "torque assist" device (or module) that may have significant utility in reducing the energy required to drive rotating machinery, such as electric car wheels, pumps, marine propellers, and the like. The magnetically-coupled device may also be used to significantly increase the energy output in applications such as wind turbines where the magnetic torque assist module may be installed between the wind vanes and an electricity-producing alternator/generator, would result in more energy output from the wind turbine at much lower wind speeds.

In addition to use in rotating machinery, the elastic nature of the magnetic circuit integral to the present disclosure also lends itself well for applications where only angular displacement is required (e.g., less than a full rotation). Applications could include, but not limited to, rehabilitation and sports training equipment, e.g., elastic resistance bands and the like, or for such applications as robotic joint torque assistance.

As described herein, the technology represented by the magnetically-coupled device or "torque assist" module described herein involves the conversion of elastic potential energy to kinetic energy. Elastic potential energy can be described as energy stored as a result of applying a force to deform an elastic object, in this case, a magnetic field. The energy is stored until the force is removed resulting in the release of kinetic energy as the elastic magnetic field springs back to its original shape, doing work (i.e., force applied× distance moved in newtons/meter or joules) in the process. The deformation would involve compressing and stretching the elastic magnetic field created by the arrangement(s) of the permanent magnets described herein.

In some embodiments, e.g., at least FIGS. 2K and 2L, deformation of the elastic magnetic field may include stretching and compressing, which for circular motion applications may also be referred to as twisting the magnetic fields about a rotational axis during the conversion from potential to kinetic energy or kinetic to potential energy.

In a simple analogy, a rubber ball, representing the "torque assist" device aggregate magnetic fields, will be compressed when struck by an outside force like a bat, causing the ball to fly off the bat in its quest to regain its round shape. The magnetic field in the torque assist will behave in a similar manner when the field is compressed and stretched by the rotation of wind turbine blades, for example, attached to the torque assist module input shaft, when pushed by an outside natural input force such as wind. When the torque assist is mounted on a shaft which connects wind turbine blades and an alternator/generator, the elasticity of the torque assist magnetic field imparts far more acceleration to the alternator/generator, than simply rotating an inelastic alternator circuit and shaft attached directly to a wind turbine, resulting in increased energy output.

As described herein, in some embodiments, the disclosure may have of three diametrically magnetized (magnetized through the diameter) high energy, rare earth NdFe cylindrical magnets aligned linearly perpendicular to a plane as described herein in FIGS. 2E and 2F. The three magnets may consist of a rotor magnet positioned linearly between two stator magnets. In particular, a bi-directional rotating magnet attached to a central axis shaft (a rotor), is placed between two fixed magnets (or stators, or collectively a stator). The three magnets are sandwiched between two parallel metal or plastic discs, which may be about 5" in diameter by about ¼" in thickness. The cylindrical magnets may be about 1" long by about 1" diameter having a about ¼" center hole. Depending on application requirements component dimensions are scalable up or down.

The rotor is mated to a center shaft, which serves as the coupling to whatever body is used to drive the torque assist device, e.g., a wind turbine, or any other prime mover that converts a natural input source of energy into mechanical and ultimately electrical energy. At rest, the rotor magnetically centers itself between the two flanking stator magnets due to opposite magnetic polarities attract. The bottom circular plate may be mounted (e.g., by an output shaft, or other appropriate coupling mechanism) to an alternator or any other device being driven.

Using the magnetic arrangement(s) described herein, in some embodiments, the more angular force applied by rotating the center rotor magnet, the stiffer the magnetic elasticity becomes until a magnetic "break point" or "decoupling point" is reached, e.g., at about 180 degrees from the start point (or resting or Equilibrium State Position (ESP) described herein), whereupon the rotor automatically snaps around to its original state (ESP). FIGS. 2B, 2C, and 2D (for two total magnets), and FIGS. 2E and 2F (for three magnets) show in a simplified fashion, the progression of centripetal compression and stretching of the magnetic flux field from rotation initiation by the rotor 204 (FIG. 2C and FIG. 2F), to just before the magnetic de-coupling break point at a little before 180 degrees (FIG. 2D), the 180 degree point shown as a vertical dashed line. When the rotor reaches the de-coupling point, the rotor automatically returns to its original state (ESP) FIG. 2B (for two magnets) and FIG. 2E (for three magnets). This magnetic breakaway or decoupling phenomenon becomes useful in certain applications such as wind turbines or other rotating applications, by acting as a "shear pin" (or a "torque limiter") preventing the device or mechanism attached to the output shaft, e.g., alternator or generator or motor, from overloading and possibly catching fire, or by preventing mechanical damage to a rotating part, e.g., a shaft or gear or propeller or blade or other part. In particular, at a pre-set "decoupling" (or "torque limit") load, the torque assist device will break the magnetic coupling and simply continue to free rotate until the load is reduced sufficiently to return to the pre-set load limit at which point the magnetic coupling will re-engage.

The strength of the magnetic field drops off geometrically from the face of the magnet so the stiffness of the magnetic circuit (or magnetic field strength) is dependent on the airgap between the rotor and the stator magnets (i.e., the rotor-stator gap). Less airgap enables more powerful units (i.e., more powerful magnetic fields, or stiffer device). Also, more powerful units can be constructed by stacking additional magnets on the stator and rotor. Units with adjustable stiffness, or elasticity, can be constructed by allowing the opposing stator magnets to be adjustable relative to the rotor magnet assembly. Stiffer torque assist modules would be particularly useful for applications where the torque assist is positioned between a power source/driver, as in an electric motor used to drive an electric car wheel or boat propeller. With the installation of a torque assist module between the motor and the wheel, less energy will be required to spin the wheel while at the same time increasing the torque available. The result is increased fuel or electrical charge efficiency and increased power and torque available.

As described herein, e.g., with at least FIGS. 2K and 2L, in some embodiments, an additional basal (or base or bottom) fixed (or stationary) magnet 202D (FIG. 2K), 202C (FIG. 2L), may be added, e.g., diametrically magnetized cylindrical magnet of the same diameter, immediately below and in-line with (or common central axis to) the rotor magnet 204. This arrangement gives the torque assist module another axis of elasticity.

As with the other embodiments discussed herein with FIGS. 2A-2F and 2M, in the basal magnet embodiment the magnetic fields are simultaneously stretched and compressed about the vertical axis of the torque assist device, which may also be referred to herein as twisted or rotated (at least partially) about the vertical axis before the magnetic decoupling occurs. The total efficiency of the torque assist module may be further enhanced by adding the basal magnet to the embodiments described above.

This basal magnet embodiment may also be used in certain applications utilizing only the rotor magnet and the basal (bottom) magnet in a simple two-magnet arrangement. A variation of such an embodiment is shown in FIGS. 2G-2J, where the rotor magnet automatically moves or "pops" away from the stator magnet along the rotation axis when magnetic decoupling occurs. As in other embodiments described herein, the magnetic elasticity characteristics of the basal magnet lends itself well for both full rotational and partial angular displacement.

It should be understood that in the context of the present disclosure, a permanent magnet is a magnet that generates a persistent magnetic field without requiring electrical current from an external power source. For example, rare-earth doped NdFe permanent magnets may be used for any of the embodiments described herein. Other permanent magnets may be used provided they provide the function and performance described herein.

The phrase "stationary magnet" or "stationary magnets" or "stator magnets" as they are used herein should not be construed to mean that the stationary magnet(s) are absolutely stationary and not moving. While in some embodiments the stationary magnet(s) is/are absolutely stationary. In other embodiments, the stationary magnet(s) may be moving generally as desired or as the application requires. Further, it should be readily understood that for embodiments disclosed herein, the "stationary" (or stator) magnet (s) may be configured to move and/or rotate with respect to the "movable" (or rotor) magnet(s) and the movable magnet (s) are configured to be stationary. Thus, in some embodiments, the stator may become the rotor and the rotor may become the stator. Accordingly, for any of the embodiments described herein having an input shaft and output shaft, the labels of the input shaft and the output shaft may be reversed if desired and the performance will be the same. Which magnets, e.g., type, material, size, power, and shape, are configured as the stationary and movable magnets may be chosen as desired and/or based on the application requirements to provide the desired performance.

It should be readily understood that the magnetic polarity of the magnets of the magnetically-coupled devices described herein can be reversed and achieve the same intended function and structure. Specifically, a magnet side (or surface) having north pole N polarity may instead have south pole S polarity and a magnet side (or surface) having south pole S polarity may instead have north pole N polarity, and the magnetically-coupled device will function substantially the same as disclosed herein.

While the present disclosure has shown and described the permanent magnets as being circular flat magnets, cylindrical magnets and bar magnets, it should be readily understood that any permanent magnet shape is within the scope of the present disclosure. Even in a single magnetically-coupled device, the stationary magnet(s) and movable magnet(s) may differ in shape and type. For example, the cylindrical magnets may be cylinders and/or cylinders with a central bore or hole defined therein in a longitudinal direction of the cylindrical magnet(s). Instead of the central bore (or in addition thereto), the magnets may be provided with blind bores. Magnets may be configured with the necessary central bore and/or blind bores for enhancing the magnetic fields thereof or generating the desired magnetic fields thereof. Other magnet shapes, such as rectangular magnets or flat magnets, may have transverse (through the thickness) bores or holes or blind bores for enhancement or desired magnetic field shapes/strengths for rotor and/or stator magnets. Further, while the stationary magnets have been described as being separate magnets, it is within the scope of the present disclosure for the stationary magnets to form a single, unitary piece or structure. Also, any given permanent magnet described herein may comprise a plurality of smaller permanent magnets that are stacked together to perform the same function and polarity as the given permanent magnet, if desired.

Advantageously, magnetically-coupled devices according to the present disclosure may be used as a "torque assist" device, which converts elastic potential energy into kinetic energy as described herein. The devices according to the present disclosure may be used to replace or supplement a spring or other elastic body in a given application. In some embodiments, instead of separate magnets providing the polarities described, there may be a single permanent magnet that has regions with the required polarities described herein. Also, in some embodiments, the polarities described herein may be provided by a plurality of small magnets attached or coupled together to provide the required polarities described herein.

Although the invention has been described and illustrated with respect to exemplary embodiments thereof, the foregoing and various other additions and omissions may be made therein and thereto without departing from the spirit and scope of the present disclosure. It should be understood that, unless otherwise explicitly or implicitly indicated herein, any of the features, characteristics, alternatives or modifications regarding a particular embodiment herein may also be applied, used, or incorporated with any other embodiment described herein.

What is claimed is:

1. A magnetically-coupled torque-assist device, comprising:
   a movable magnet configured to rotate about a movable magnet axis extending through the movable magnet;
   a first stationary magnet;
   a second stationary magnet; and
   a third stationary magnet;

wherein the first stationary magnet, the second stationary magnet and the third stationary magnet are permanent magnets and are arranged on a stationary magnet line;

wherein the second stationary magnet is arranged between the first stationary magnet and the third stationary magnet;

wherein the first stationary magnet has a first polarity on a side facing the movable magnet;

wherein the second stationary magnet has a second polarity on a side facing the movable magnet; and wherein the third stationary magnet has the first polarity on a side facing the movable magnet.

2. The magnetically-coupled torque-assist device according to claim 1, wherein the movable magnet has the first polarity on a side facing the first stationary magnet, the second stationary magnet and the third stationary magnet.

3. The magnetically-coupled torque-assist device according to claim 1, wherein the movable magnet has the second polarity on a side facing the first stationary magnet, the second stationary magnet and the third stationary magnet.

4. The magnetically-coupled torque-assist device according to claim 1, further comprising a first additional stationary magnet and a second additional stationary magnet, wherein the first additional stationary magnet and the second additional stationary magnet are arranged on opposite sides of the first stationary magnet, the second stationary magnet and the third stationary magnet.

5. The magnetically-coupled torque-assist device according to claim 1, wherein the first stationary magnet, the second stationary magnet and the third stationary magnet form a single, unitary structure.

6. The magnetically-coupled torque-assist device according to claim 1, wherein the first stationary magnet, the second stationary magnet and the third stationary magnet are arranged in a rotatable housing.

7. The magnetically-coupled torque assist device according to claim 1, wherein the moveable magnet and at least one of the first, second, and third stationary magnets are configured to have a gap therebetween to create a Halbach-effect magnetic field bloom, which contributes to a resultant magnetic force on the moveable magnet.

8. The magnetically-coupled torque-assist device according to claim 1, wherein the movable magnet and the first, second and third stationary magnets are rectangular magnets.

* * * * *